(12) United States Patent
Bortolato

(10) Patent No.: US 12,153,662 B2
(45) Date of Patent: Nov. 26, 2024

(54) METASTRUCTURED PHOTONIC DEVICE AUTHENTICATION

(71) Applicant: X Development LLC, Mountain View, CA (US)

(72) Inventor: Cyril Bortolato, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 773 days.

(21) Appl. No.: 17/222,624

(22) Filed: Apr. 5, 2021

(65) Prior Publication Data

US 2022/0318365 A1    Oct. 6, 2022

(51) Int. Cl.
*G06F 21/44* (2013.01)
*G06F 21/45* (2013.01)
*H04B 10/70* (2013.01)

(52) U.S. Cl.
CPC .............. *G06F 21/44* (2013.01); *G06F 21/45* (2013.01); *H04B 10/70* (2013.01)

(58) Field of Classification Search
None
See application file for complete search history.

(56) References Cited

U.S. PATENT DOCUMENTS

| | | | |
|---|---|---|---|
| 3,875,451 A | * | 4/1975 | Bachmann .......... H01L 33/0008 313/499 |
| 4,279,464 A | | 7/1981 | Colombini |
| 4,555,810 A | * | 11/1985 | Khoe ................... H04J 14/025 398/58 |
| 4,696,536 A | | 9/1987 | Albares et al. |

(Continued)

FOREIGN PATENT DOCUMENTS

| JP | 2017524966 A | 8/2017 |
|---|---|---|
| KR | 101885080 B1 | 8/2018 |

(Continued)

OTHER PUBLICATIONS

Piggott et al., Inverse design and demonstration of a compact and broadband on-chip wavelength demultiplexer, arXiv:1504.00095v1, Physics.optics, Apr. 1, 2015, 15 pages.

(Continued)

*Primary Examiner* — Darren E Wolf
(74) *Attorney, Agent, or Firm* — Christensen O'Connor Johnson Kindness PLLC

(57) ABSTRACT

A photonic device is provided. The photonic device may include an input region and a dispersive region optically coupled with the input region. The dispersive region may include a first material and a second material anisotropically distributed to form a plurality of interfaces that each correspond to a change in a refractive index of the dispersive region. The plurality of interfaces may collectively structure the dispersive region to generate an output optical signal from an input optical signal. The photonic device may also include an output region, optically coupled with the dispersive region. The plurality of interfaces may form a material interface pattern in the dispersive region that is characterized by a defect distribution to introduce one or more spectral artifacts into the output optical signal that collectively define a unique spectral signature of the photonic device.

18 Claims, 8 Drawing Sheets

(56) References Cited

U.S. PATENT DOCUMENTS

| | | | |
|---|---|---|---|
| 4,878,726 A * | 11/1989 | Fatehi | H04B 10/032 398/20 |
| 5,774,693 A | 6/1998 | Hsu et al. | |
| 6,281,997 B1 | 8/2001 | Alexander et al. | |
| 6,567,196 B1 | 5/2003 | Archambault | |
| 6,584,214 B1 * | 6/2003 | Pappu | G07D 7/121 382/206 |
| 6,606,427 B1 | 8/2003 | Graves et al. | |
| 6,618,535 B1 | 9/2003 | Reynolds | |
| 6,675,072 B1 * | 1/2004 | Kerem | G05D 23/1931 62/3.6 |
| 6,734,453 B2 | 5/2004 | Atanackovic et al. | |
| 6,772,076 B2 | 8/2004 | Yamamoto et al. | |
| 7,806,322 B2 * | 10/2010 | Brundage | G07C 9/257 235/380 |
| 7,853,792 B2 * | 12/2010 | Cowburn | G07D 7/0043 713/176 |
| 8,532,446 B2 | 9/2013 | Zheng et al. | |
| 9,589,757 B1 | 3/2017 | Hannon et al. | |
| 10,862,610 B1 | 12/2020 | Schubert et al. | |
| 2002/0110306 A1 | 8/2002 | Hamada | |
| 2004/0156610 A1 | 8/2004 | Charlton et al. | |
| 2010/0007930 A1 * | 1/2010 | Cowburn | G07D 7/2033 382/218 |
| 2014/0108786 A1 * | 4/2014 | Kreft | G06Q 20/3825 713/194 |
| 2014/0204452 A1 * | 7/2014 | Branson | G02B 26/02 359/290 |
| 2014/0365188 A1 | 12/2014 | Doerr | |
| 2015/0156568 A1 * | 6/2015 | Byers | H04B 10/1149 398/55 |
| 2015/0295672 A1 | 10/2015 | Okayama | |
| 2016/0012176 A1 | 1/2016 | Liu et al. | |
| 2016/0018595 A1 | 1/2016 | Krishnamurthi et al. | |
| 2016/0033765 A1 | 2/2016 | Liu et al. | |
| 2016/0036550 A1 | 2/2016 | Welch | |
| 2016/0119057 A1 | 4/2016 | Mekis et al. | |
| 2016/0174902 A1 | 6/2016 | Georgescu et al. | |
| 2018/0018757 A1 | 1/2018 | Suzuki | |
| 2018/0045953 A1 | 2/2018 | Fan et al. | |
| 2020/0257751 A1 | 8/2020 | Engheta et al. | |

FOREIGN PATENT DOCUMENTS

| | | |
|---|---|---|
| WO | 2017/176370 A1 | 10/2017 |
| WO | 2017/223560 A1 | 12/2017 |
| WO | 2018215774 A1 | 11/2018 |

OTHER PUBLICATIONS

Piggott et al., Fabrication-constrained nanophotonic inverse design, Scientific Reports, www.nature.com/scientificreports, May 11, 2017, 7 pages.

Su et al., Inverse design and demonstration of a compact on-chip narrowband three-channel wavelength demultiplexer, arXiv:1709.08809v1, physics.app-ph, Aug. 17, 2017, 6 pages.

Yao et al., Intelligent nanophotonics: merging photonics and artificial intelligence at the nanoscale, Nanophotonics, 2019, 28 pages.

Zhao et al., Multichannel vectorial holographic display and encryption, Light: Science & Applications, 2018, 9 pages.

Mehdizadeh et al., "All Optical 8-channel wavelength division demultiplexer based on photonic crystal ring resonators", Department of Electrical Engineering, Shahid Chamran University of Ahvaz, Dec. 2017, 10th International Conference on Electrical and Electronics Engineering, 5 pages.

CWDM Optical Modules, 4/8/16/18 Channel CWDM Optical Mux/Demux Modules, Space-saving, modular platform for advanced signal processing, Sep. 15, 2016 https://www.grassvalley.com/docs/DataSheets/purple/GVB-1-0432C-EN-DS-CWDM.pdf 2 pages.

OP+CWDM8+UD, 8-Channel Passive CWDM Multiplexer/Demultiplexer, http://www.imaginecommunications.com/products/networking/processing/selenio-6800/selenio-6800-fiber-optics/opcwdm8ud, 2016, 3 pages.

WaveReady 8-Channel Modular Multiplexer/Demultiplexer Upgradeable to 40 Channels, MDX-08MD1Z1xB, www.umentum.com, 2015, 4 pages.

Vercruysse et al., "Analytical level set fabrication constraints for inverse design", Scientific Reports, www.nature.com/scientificreports, Jun. 21, 2019, 7 pages.

Wavelength-division multiplexing, Wikipedia Article, https://en.wikipedia/org/wiki/wavelength-division_multiplexing, Jan. 28, 2019.

400G CWDM8 MSA 2 km Optical Interface Technical Specifications Revision 1.1., Feb. 13, 2018, 16 pages.

400G CWDM8 10 km Optical Interface Technical Specifications Revision 1.1., Feb. 13, 2018, 16 pages.

Moscoso-Mártir et al. "8-channel WDM silicon photonics transceiver with SOA and semiconductor mode-locked laser", Optics Express 25446, vol. 26, No. 19, Sep. 17, 2018, 14 pages.

Absil et al., "Advances in silicon photonics WDM devices", http://proceedings.spiedigitallibrary.org, SPIE vol. 9010 90100J-1, Oct. 6, 2014, 7 pages.

8-Channel Analog Multiplexer/Demultiplexer with Injection-Current Effect Control, Texas Instruments, Oct. 2012, 21 pages.

Chen, et al., "Neural Ordinary Differential Equations", 32nd Conference on Neural Information Processing Systems (NIPS 2018), Oct. 22, 2018, 18 pages.

Petykiewicz et al., "Active Nanophotonics: Inverse Design and Strained Germanium Light Emitters", A Dissertation Submitted to the Department of Electrical Engineering and the Committee on Graduate Studies of Stanford University, Oct. 2016. 134 pages.

Ying-Shou Lu "Nanophotonic Computational Design", A Dissertation Submitted to the Department of Electrical Engineering and the Committee on Graduate Studies of Stanford University, Jun. 2013, 122 pages.

Piggott, "Automated Design of Photonic Devices", A Dissertation Submitted to the Department of Electrical Engineering and the Committee on Graduate Studies of Stanford University, Jun. 2018, 112 pages.

Lu, et al., "Nanophotonic Computational Design", Optics Express, vol. 21, No. 11, Jun. 3, 2013, 17 pages.

Piggott et al., "Inverse Design and Implementation of a Wavelength Demultiplexing Grating Coupler", Scientific Reports, Nov. 27, 2014, 5 pages.

Piggott et al., "Inverse Design and Demonstration of a Compact and Broadband On-Chip Wavelength Demultiplexer", Nature Photonics, May 11, 2015, 5 pages.

Piggott et al., "Silicon Photonics: Design Approach to Integrated Photonics Explores Entire Space of Fabricable Devices", Laser Focus World, Aug. 13, 2018, 5 pages.

Su et al., Fully-Automated Optimization of Grating Couplers, Optics Express, vol. 26, No. 4m Feb. 2018, 12 pages.

Robinson "First-Principle Derivation of Gain in High-Index-Contrast Waveguides", Optics Express, vol. 16, No. 21, Oct. 13, 2008, 11 pages.

Lalau-Keraly et al., "Adjoint Shape Optimization Applied to Electromagnetic Design", Optical Society of America, 2013, 9 pages.

Yilmaz et al., "Inverse design of efficient and compact 1 x N wavelength demultiplexer", Optics Communications, www.elsevier.com/locate/optcom, Sep. 7, 2019, 7 pages.

International Search Report and Written Opinion, mailed Feb. 9, 2021, in corresponding International Patent Application No. PCT/US2020/056674, 10 pages.

International Search Report and Written Opinion, mailed Feb. 9, 2021, in corresponding International Patent Application No. PCT/US2020/056695, 13 pages.

U.S. Appl. No. 16/685,473, filed Nov. 15, 2019, 81 pages.

* cited by examiner $S_{in}$ $S_{out}$

METASTRUCTURED PHOTONIC DEVICE AUTHENTICATION

TECHNICAL FIELD

This disclosure relates generally to photonic devices, and in particular but not exclusively, relates to optical integrated circuits for authentication applications.

BACKGROUND INFORMATION

Optical elements may be used to transform an optical signal. For example, a neutral density filter may be used to attenuate an optical signal, a polarizer may be used to polarize an optical signal, and an optical mode selector may be used to reduce the number and types of optical modes associated with an optical signal. A combination of optical elements may be used to apply multiple transformations to an input optical signal, resulting in an output optical signal. Metastructured photonic devices may be designed to apply multiple transformations to an optical signal, instead of or in addition to discrete optical elements.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
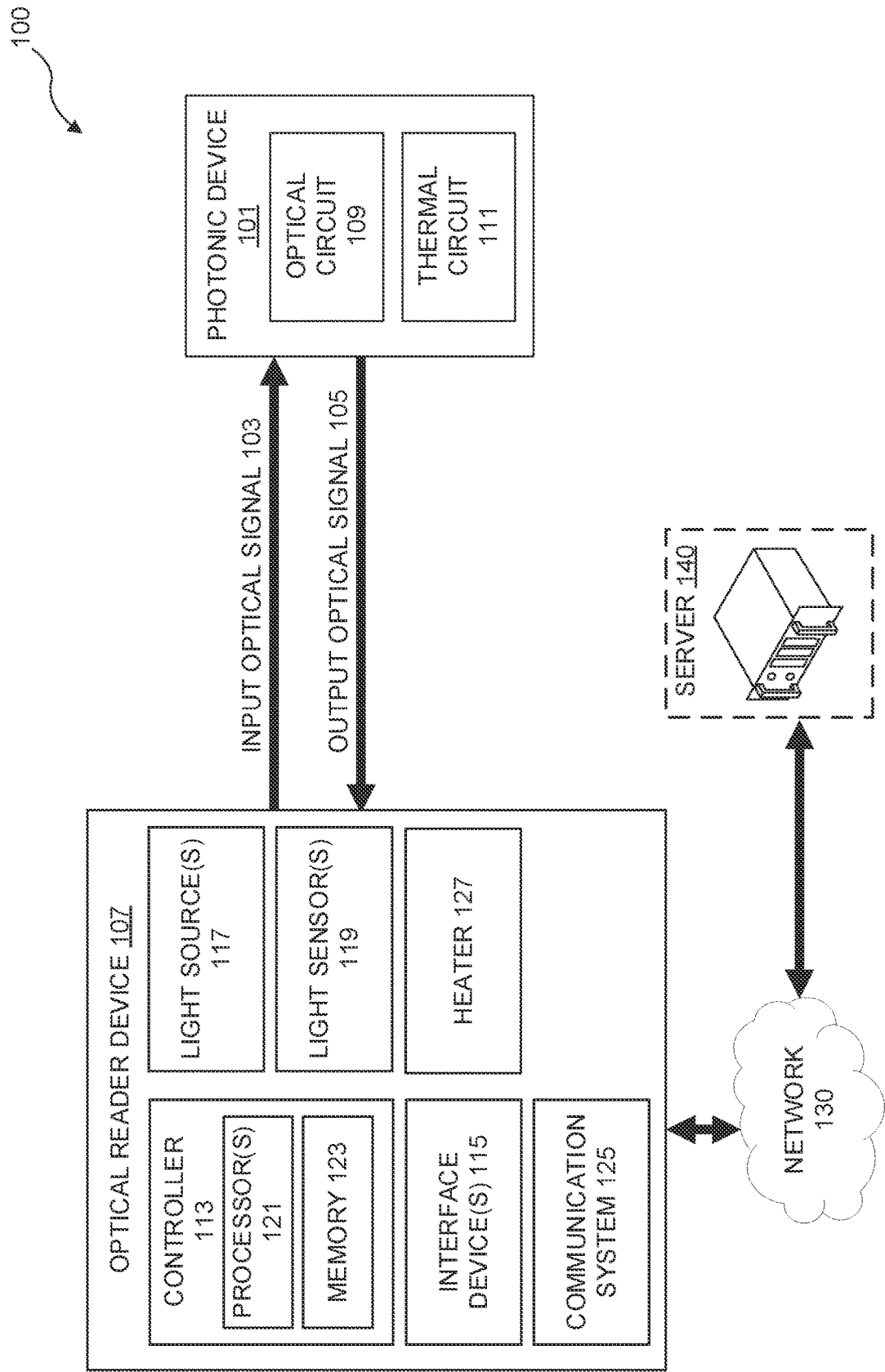
FIG. 1 is a functional block diagram illustrating a system for authentication of a photonic device via an optical signal, in accordance with an embodiment of the present disclosure.

Embodiments of photonic devices, including optical key devices, incorporating manufacturing defects to define a unique spectral signature are described herein. Methods for generating a design of the photonic devices and methods for using the photonic devices as part of an authentication system are also described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Optical key devices take advantage of the capability of electromagnetic signals to interact with a material in a way that permits the devices, and therefore the bearer of the devices, to be recognized. For example, optical key devices can receive an input optical signal, such as a laser beam or polychromatic light from an LED array, can route the signal through an optical circuit, and can return an output optical signal. Optical circuits can include diverse types of optical elements, such as filters, attenuators, mode selectors, splitters, switches, polarizers, or the like. The combination of optical elements making up the optical circuit can generate an output optical signal characteristic of the optical circuit that can be used to distinguish one optical key from another and can be used to authenticate the optical key.

Relative to mechanical keys or RFID keys, optical key devices can be less vulnerable to attack and/or compromise both by computer-based hacking and by physical duplication, at least because the active components of an optical key may include little if any software and may exhibit few if any visible parts. However, it may be possible to reverse engineer the optical key. Using a reverse engineered optical circuit design, the optical key may be duplicated with a relatively high degree of fidelity to the design.

Photonic devices may be realized as metastructured materials. These metastructured materials can be designed to apply one or more transformations to an input optical signal, which can be applied to various ends including, but not limited to, wavelength multiplexing/demultiplexing, wavelength-selective reflectivity, TE/TM separation, neutral-density attenuation, or other arbitrary functions. Photonic devices may still be vulnerable to duplication were the device to be misappropriated, for example, using an image of the metastructure. The image of the metastructure could also be used to simulate and spoof the output signal, were the input signal to be known.

Described herein are embodiments of a photonic device (e.g., an optical key device) having a design obtainable by an inverse design process. The inverse design process may provide for a random or pseudo-random defect distribution in the material interface pattern. The defect distribution may result from manufacturing defects resulting from features of the design having a size smaller than a threshold size, beyond which a fabrication technique may unpredictably deviate from the design (e.g., by omitting or enlarging the under-sized feature). In this way, the defects created in the interface pattern during manufacturing may introduce one or more spectral artifacts into the output optical signal. The defect distribution may be pseudo-random, at least in part because the inverse design process may provide for the output optical signal to reproduce a target loss signal, which may determine the metastructure. The spectral artifacts may be detectable within the output optical signal by comparison of the output optical signal to a simulated output signal based on the design or to the target loss signal.

Advantageously, the metastructure does not apply discrete transformations at specific positions in the optical device, unlike an optical circuit composed of discrete optical elements, such as lenses or gratings. Instead, the metastructure may transform the input optical signal through complex interactions with the interfaces making up the material interface pattern, with no single interface of the material interface pattern being individually responsible for the generation of any one aspect of the output optical signal. In this way, spectral artifacts resulting from randomly distributed defects or pseudo-randomly distributed defects pose a significant challenge for reverse engineering of a photonic device.

Inverse design techniques described in embodiments herein may utilize gradient-based optimization in combination with first-principle simulations to generate a design from an understanding of the underlying physics that are expected to govern the operation of the photonic device. In some embodiments, design optimization of photonic devices without gradient-based techniques may also be used. Similarly, while the exemplary embodiments described herein focus on photonic devices and optical signals, these are not intended to be limiting examples. Inverse design techniques may be similarly applied to generate devices operating in diverse ranges of the electromagnetic spectrum, such as radio, microwave, or x-ray spectral ranges, where the principles described herein may be applied to design and manufacture a dispersive element to apply one or more transformations to an input signal in the respective spectral range. As an illustrative example, a radio-frequency device may be designed to transform and reflect an input radio signal to generate an output radio signal in such a way that the radio-frequency device may be authenticated, based at least in part on spectral artifacts introduced into the output radio signal by defects in the dispersive metastructure.

FIG. 1 is a functional block diagram illustrating a system 100 for authentication of a photonic device 101 via an optical signal, in accordance with an embodiment of the present disclosure. The illustrated embodiment of system 100 includes a photonic device 101, an optical reader device 107, and a server 140 communicatively coupled to the optical reader device 107 via a network 130. The illustrated embodiment of photonic device 101 includes an optical circuit 109 and a thermal circuit 111. The illustrated embodiment of optical reader device 107 includes a controller 113 (including a processor 121 and memory 123), interface device(s) 115, light source(s) 117, light sensor(s) 119, a communication system 125, and a heater 127.

Photonic device 101 is configured to apply one or more transformations to light from one or more input optical signals 103 as part of an approach to generating one or more output optical signals 105. In some embodiments, the input optical signal 103 is provided by an optical reader device 107, for example, via an optical fiber, a light guide, a wave guide, and/or over the air, as part of an optical circuit that permits the photonic device 101 to receive the input optical signal 103 and return the output optical signal 105 to the optical reader device 107. As part of a security, authentication, or encryption system, the optical reader device 107 may communicate with a network 130 and/or a server 140, for example, as part of a networked system of optical reader devices deployed in an area or site, to protect proprietary and/or otherwise sensitive or secret data in a centralized and protected data store, or to permit miniaturization and portability of the optical reader device 107.

In some embodiments, the photonic device 101 receives the input optical signal at an input to an optical circuit 109. The optical circuit 109 may include optical elements disposed to conduct the input optical signal 103 to an input region of a dispersive element and to conduct the output optical signal 105 from an output region of the dispersive element, as described in more detail in reference to FIG. 2. For example, the optical circuit 109 may include one or more input couplers to receive the input optical signal 103 and to couple the input optical signal 103 into the input region of the dispersive element, such that the input optical signal 103 may be provided to the dispersive element. For example, the input coupler may be or include a refractive optical element (e.g., a prism) or a diffractive optical element (e.g., an input grating), disposed on a silicon waveguide to couple the input optical signal 103 into the waveguide at an angle that provides for total internal reflection of the input optical signal 103. Similarly, one or more output couplers may be optically coupled to the dispersive element. To that end, one or more of the optical elements of the optical circuit 109 may be coated with reflective and/or anti-reflective coatings, as an approach to reducing signal loss at boundaries between elements.

In some embodiments, the photonic device 101 may include a thermal circuit 111 in thermal communication with the optical circuit 109. The thermal circuit 111 may be or include active and/or passive elements to control and/or maintain the optical circuit 109 at an operating temperature. As described in more detail in reference to FIG. 2, the optical circuit 109 may be designed to generate the output optical signal 105 from the input optical signal 103 at the operating temperature, but to generate a different output signal, or no output signal, at a temperature different from the operating temperature. Temperature dependency may be due at least in part to thermal sensitivity of refractive materials (e.g., a dependence of index of refraction on temperature and/or thermal expansion).

In this way, the thermal circuit 111 may include a resistive heating element and/or a thermal mass, as an approach to providing a stable temperature set point for operation. In some embodiments, for example, where the optical reader device includes a temperature control system, the photonic device 101 may omit the thermal circuit 111, and instead may be designed with relatively high thermal conductivity and relatively low thermal mass, such that it may be brough to the operating temperature quickly and maintained by the optical reader device 107.

Advantageously, the thermal operating principle of the optical circuit 109 may provide additional security and robustness against compromise for the photonic device 101. In some embodiments, the operating temperature may be provided as a design parameter of the photonic device 101 and may be used as part of the authentication technique for the photonic device 101. For example, the optical reader device 107 may receive the operating temperature from the server 140 as part of an authentication protocol, and may bring the photonic device 101 to the operating temperature by providing power to the thermal circuit 111 (e.g., when the thermal circuit 111 includes a heating element) prior to sending the input optical signal 103 to the optical circuit 109. In some embodiments, the thermal circuit 111 includes control elements and heating elements, such that the photonic device 101 may receive power from the optical reader device 107 and may maintain the operating temperature. As an approach to providing improved security, the control elements of the photonic device 101 may receive a temperature control set point from the optical reader device 107 without storing the operating temperature.

It is appreciated that the photonic device 101 may be realized as a silicon on insulator device, which may be integrated into a semiconductor substrate, such as a microprocessor wafer or CMOS device. In this way, the photonic device 101 may be implemented as an approach to authenticate the substrate. For example, the photonic device 101 may be fabricated into the substrate and may permit the optical interrogation of the photonic device 101 through optical systems used to characterize the substrate (e.g., for quality control and assurance). Similarly, the photonic device 101 may be integrated into a label, tag, or other marker affixed or otherwise attached to an object, such that a mobile electronic device, equipped to provide the functions of the optical reader device 107, may authenticate the object.

In an illustrative example, the photonic device may be incorporated into a label used to identify goods in transit and may be checked using the optical reader device 107 to authenticate the provenance of the object. Advantageously, the improved security of the photonic device 101 relative to optical codes (e.g., barcodes, QR codes, etc.), may reduce the risk of counterfeit objects infiltrating a supply chain. In another illustrative example, the photonic device 101 may be used to authenticate medical implants before and after implantation. In this example, the photonic device may be integrated into an implantable object, such as an automatic electronic defibrillator, in such a way that the input optical signal 103, selected from a wavelength range that is transmissible through the skin, may be received at the optical circuit 109. Advantageously, such an approach may permit the implant to be authenticated without using x-rays or radio waves, to which the implant or the body may be sensitive. In this example, the photonic device 101 may be designed to operate at the average body temperature and, as such, may omit the thermal circuit 111.

In the illustrated embodiment, optical reader device 107 includes a controller 113, one or more interface devices 115 (e.g., fiber optic couplers, light guides, waveguides, and the like), one or more light sources 117 (e.g., light emitting diodes, lasers, and the like), and one or more light sensors 119 (e.g., photodiodes, phototransistors, photoresistors, and the like). The controller 113 may include one or more processors 121 (e.g., one or more central processing units, application specific circuits, field programmable gate arrays, or otherwise) and memory 123 (e.g., volatile memory such as DRAM and SRAM, non-volatile memory such as ROM, flash memory, and the like). The controller 113 may orchestrate operation of optical reader device 107 for transmitting and/or receiving optical signals (e.g., input optical signal 103 and output optical signal 105). The controller 113 may include software (e.g., instructions included in memory 123 coupled to processor 121) and/or hardware logic (e.g., application specific integrated circuits, field-programmable gate arrays, and the like) that when executed by controller 113 causes controller 113 and/or optical reader device 107 to perform operations. The optical reader device 107 may include a communication system 125. The communication system 125 may permit the optical reader device 107 to communicate over the network 130, for example with the server 140, with other devices as part of the system 100.

It is appreciated that description of some elements of optical reader device 107 and/or photonic device 101 have been omitted to avoid obscuring certain aspects of the disclosure. For example, optical reader device 107 and/or photonic device 101 may include amplification circuitry, lenses, or other components to facilitate transmitting and receiving optical signals. It is further appreciated that, in some embodiments, optical reader device 107 and/or photonic device 101 may not necessarily include all elements illustrated in FIG. 1.

Figure 2A:
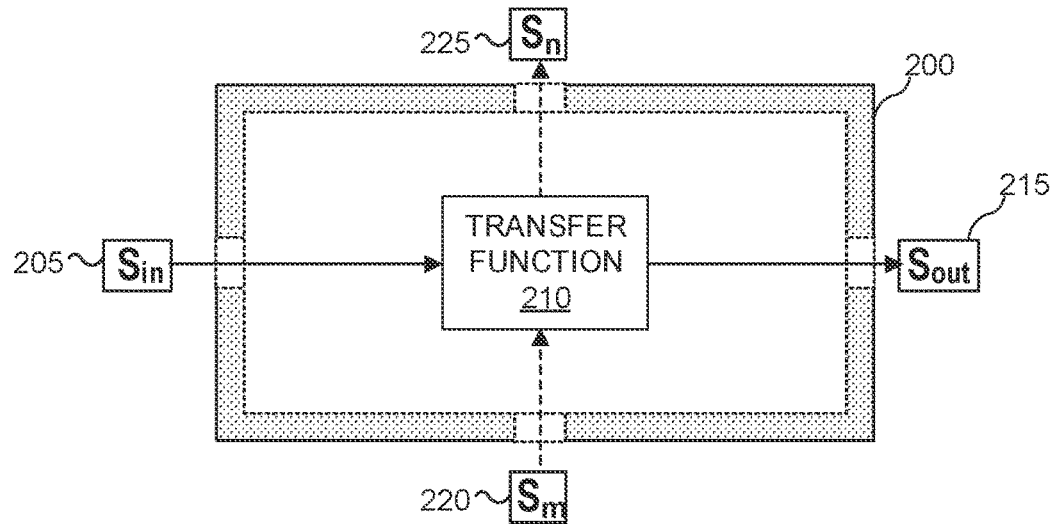
FIG. 2A illustrates an example photonic device, in accordance with an embodiment of the present disclosure.

FIG. 2A illustrates an example photonic device 200, in accordance with an embodiment of the present disclosure. The photonic device 200 may be an example of the photonic device 101 described in reference to FIG. 1. In some embodiments, the photonic device 200 may be or include a metastructured dispersive region, as described in more detail in reference to FIGS. 3A-4A, that is designed to receive an input signal 205 ("$S_{in}$," e.g., input optical signal 103 of FIG. 1), to modify the input signal 205 by applying one or more transfer functions 210 to the input signal 205, and to generate an output signal 215 ("$S_{out}$," e.g., output optical signal 105 of FIG. 1) that reflects the output of the one or more transfer functions 210.

Figure 3A:
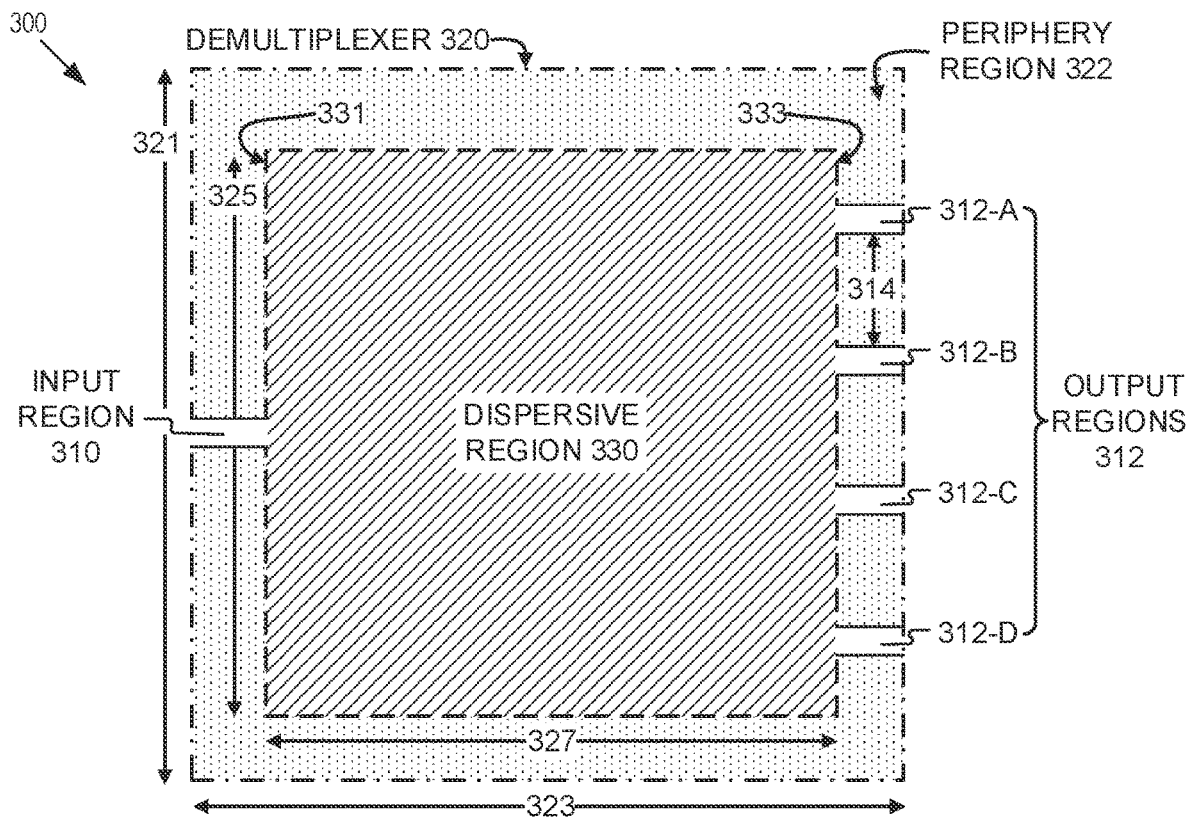
FIG. 3A illustrates an example photonic device, in accordance with an embodiment of the present disclosure.

While further description is focused on an exemplary embodiment having a single input signal 205 and a single output signal 215 oriented in a pass-through configuration, the photonic device 200 may be designed to receive additional input signals 220 ("Sm") and/or generate additional output signals 225 ("Se"), as described in more detail in reference to FIG. 3A. Furthermore, the photonic device 200 may be designed to produce the output signal 215 at a nonzero angle relative to the input signal 205. For example, the photonic device 200 may reflect the output signal 215 back parallel to the input signal 205. In another example, the output signal 215 may be provided at an angle substantially perpendicular to the input signal 205.

Without being limited only to techniques applied in signal analysis or time-variant periodic signal processing, the term transfer function 210, as applied herein, is used to describe a functional formulation of an optical transformation applied to the input signal 205 as part of generating the output signal 215. For example, the transfer function 210 may describe a wavelength selective filter, which may include attenuating, blocking, or demultiplexing the input signal 205 in a wavelength specific way. Similarly, the transfer function 210 may describe a mode selector, by which the photonic device may reduce a number of optical modes between the input signal 205 and the output signal 210 and/or select a specific mode or modes. Similarly, the transfer function 210 may describe a signal attenuator, which may provide for the output signal 210 to be attenuated over at least a portion of the wavelength range of the input signal. For example, the transfer function 210 may be or include a neutral density filter designed to attenuate the input signal 205 across the entire wavelength spectrum of the input signal 205. In some embodiments, the transfer function 210 may describe a TE-TM mode separator, by which the photonic device 200 may output the TE component of the input signal 205 as the output signal 214 and may block or redirect the TM component of the input signal 205, or vice versa. In some embodiments, the transfer function 210 may describe a phase shift transformation, by which the photonic device shifts the phase of the input optical signal 205.

Figure 2B:
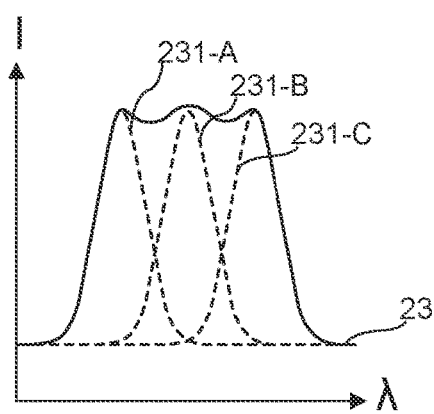
FIG. 2B illustrates an example input optical signal and an example output optical signal generated by an example photonic device, in accordance with an embodiment of the present disclosure.
Figure 2B:
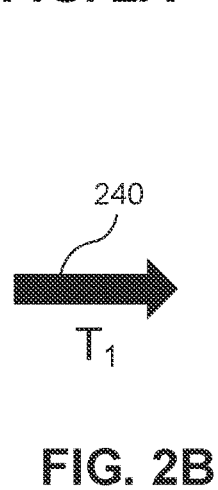

FIG. 2B illustrates an example input optical signal 230 and an example output optical signal 235 generated by an example photonic device, in accordance with an embodiment of the present disclosure. The example photonic device may be an example of photonic device 101 of FIG. 1 or photonic device 200 of FIG. 2A, which may be designed to apply a transformation 240 to the input optical signal 230 as part of generating the output optical signal 235. As described in more detail in reference to FIG. 1, the transformation 240 may include a dependency on temperature, such that the example photonic device may generate the output optical signal 235 from the input optical signal 230 at an operating temperature ("Ti"), but may generate a different output signal or no output signal at a temperature different from the operating temperature.

The transformation 240 may include multiple constituent transformations applied to the input optical signal 230 by the example photonic device. In the illustrative example shown in FIG. 2B, the input optical signal 230 includes three constituent signals 231-A-C, which combine to form a sum signal. The transformation 240, in the illustrated example, applies a high-pass wavelength selective filtration at wavelengths longer than a cutoff wavelength 237, and attenuates all wavelength components of the input optical signal 230. The resulting output optical signal 235 is characterized by a minimum signal intensity at wavelengths above the cutoff wavelength 237 and by an average attenuation 239 that is not wavelength specific.

The transformation 240 may be applied to the input optical signal 230 by a metastructure, rather than by discrete optical elements. In this way, the photonic device may implement the transformation 240 using distributed interactions in a dispersive region. This is in contrast to passing the input optical signal 230 through a discrete neutral density filter and passing an attenuated signal through a high-pass filter to generate an attenuated and filtered output optical signal. In contrast, the metastructure of the photonic device 200 may be or include a plurality of features of a first material and a second material, including but not limited to silicon and silicon oxide, that collectively define a material interface pattern in a dispersive region of the photonic device 200.

Figure 2C:
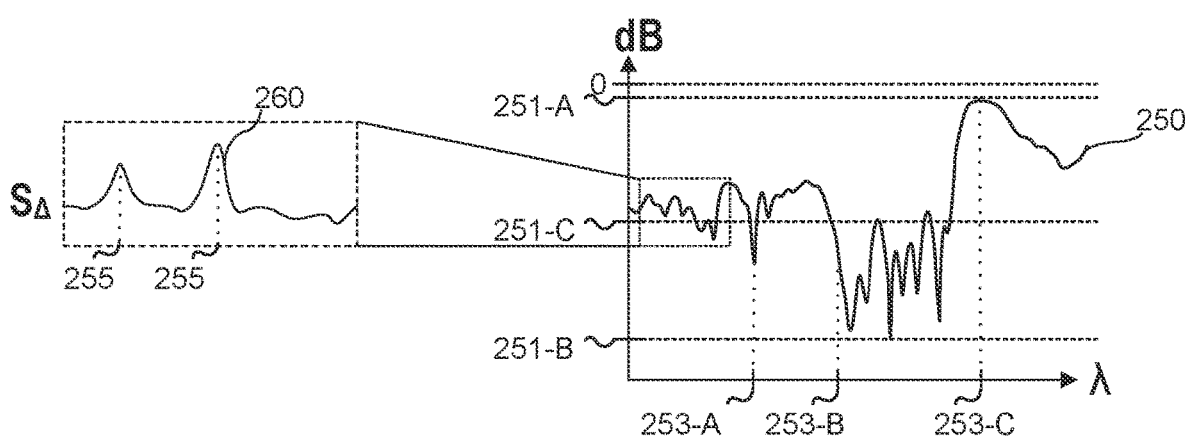
FIG. 2C illustrates an example loss signal generated by an example photonic device, in accordance with an embodiment of the present disclosure.

FIG. 2C illustrates an example loss signal 250 generated by an example photonic device, in accordance with an embodiment of the present disclosure. The example photonic device may be an example of photonic device 101 of FIG. 1 or photonic device 200 of FIG. 2A. The loss signal 250 may describe a difference between an output optical signal (e.g., output optical signal 105 of FIG. 1) and the input optical signal (e.g., input optical signal 103 of FIG. 1). In some embodiments, the loss signal 250 may be characterized by one or more spectral features, including, but not limited to, attenuation features 251 and/or wavelength features 253. Attenuation features 251 may include, but are not limited to, a lower limit attenuation 251-A, a peak attenuation 251-B, and/or an average attenuation 251-C. Similarly, wavelength features 253 may include, but are not limited to, one or more features that describe stationary points, inflection points, and/or wavelengths corresponding to attenuation features 251. Such features may be useful to describe the photonic device in terms of the transformations applied, such as the cutoff wavelengths of a bandpass filter, the effective optical density of an attenuator, etc.

Figure 5:
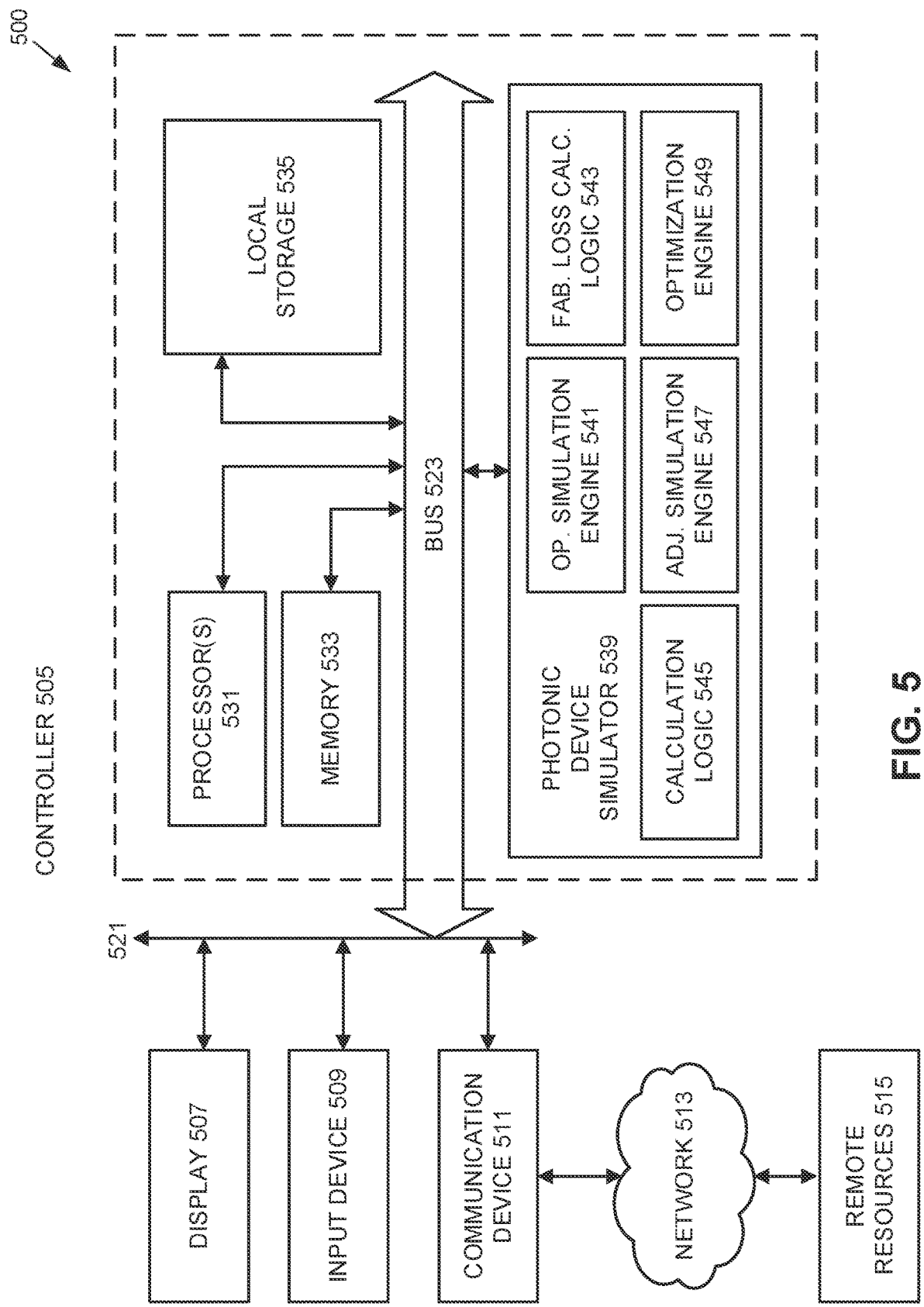
FIG. 5 is a functional block diagram illustrating a system for generating a design of a photonic integrated circuit, in accordance with an embodiment of the present disclosure.
Figure 6:
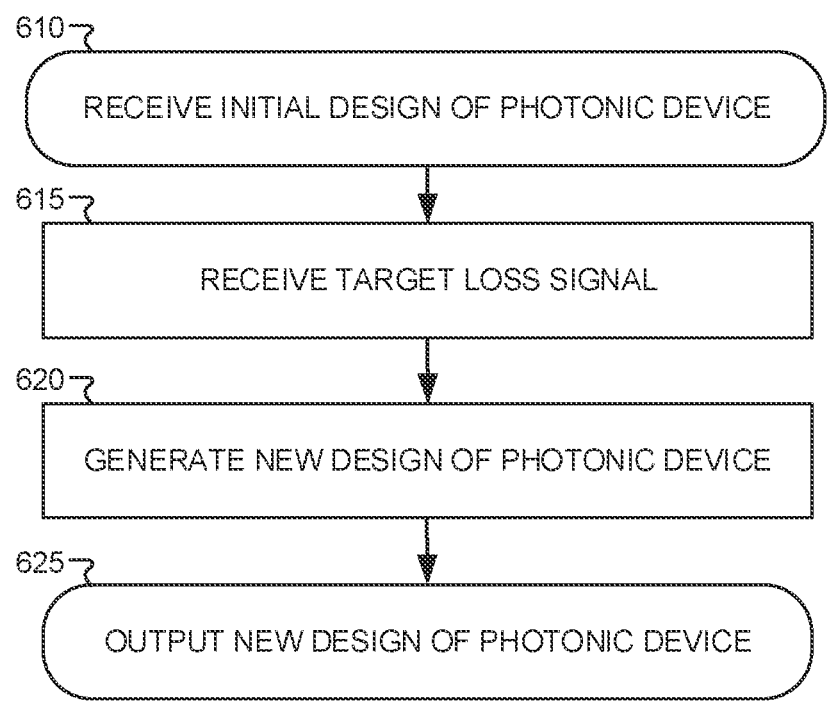
FIG. 6 shows an example method for generating a design of a photonic device, in accordance with an embodiment of the present disclosure.
Figure 7:
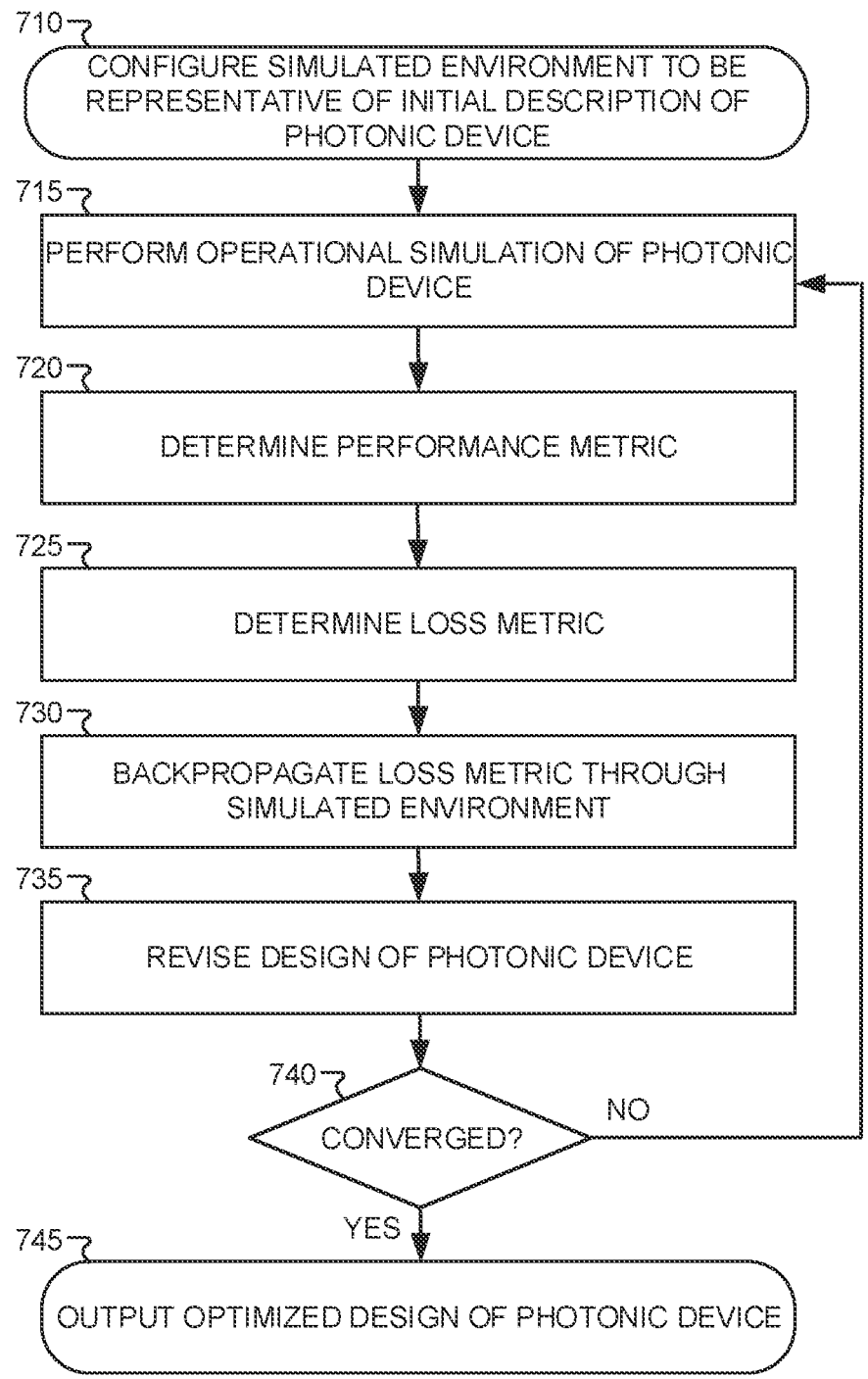
FIG. 7 shows an example method for optimizing a design of a photonic device, in accordance with an embodiment of the present disclosure.

As described in more detail in reference to FIGS. 5-7, the loss signal 250 may be applied at one or more points in the design process of the photonic device. For example, a design process for the photonic device may be or include an inverse design process using the loss signal 250 as a target loss signal. The target loss signal may be used as part of designing the metastructure of the photonic device, for example, as part of an iterative simulation approach, such that the photonic device reproduces the loss signal 250 when provided with the appropriate input optical signal. In some embodiments, the features of the loss signal 250 may be referenced as part of authentication techniques using the photonic device, as described in more detail in reference to FIG. 1 and FIG. 8. For example, a numerical representation of the input signal and a simulated output signal may be stored on a server (e.g., server 140 of FIG. 1).

In addition to the features introduced into the loss signal 250 by the transformation (e.g., transformation 240 of FIG. 2B), the loss signal 250 may incorporate one or more spectral artifacts 255. The spectral artifacts 255 may be or include one or more deviations in the loss signal 250 relative to a target loss signal that was used during the design of the photonic device. For example, FIG. 2C includes in an inset a portion of the wavelength range covered by the loss signal 250. The inset illustrates a difference signal 260 ("$S_\Delta$") between the loss signal 250 and a hypothetical target loss signal used to design the photonic device. Spectral artifacts 255 may be detectable in the difference signal 260 using, for example, an intensity threshold, or other distinguishing characteristics of the spectral artifacts 255 relative to other sources of deviation, such as noise or artifacts introduced by the light source and/or the sensor. In this way, the spectral artifacts 255 may be attributed to manufacturing defects rather and may be used at least in part to authenticate the photonic device.

Detection and matching of the spectral artifacts 255 may permit the photonic device itself to be identified and authenticated using a unique spectral signature. For example, a set of photonic devices may be issued that each generate a similar output optical signal according to the same design. Each device, however, may incorporate different spectral artifacts that may be introduced by randomly or pseudo-randomly distributed manufacturing defects. In this way, the photonic devices of the set of photonic devices may each have a unique spectral signature, while also generating output signals that match the loss signal 250 within a confidence interval (e.g., 1%, 5%, 10%, etc).

The identification of the spectral artifacts 255 may be applied as additional security for the photonic device. For example, data describing the spectral artifacts may be stored separately from numerical representations of the output optical signal, for example, as part of a data table or a lookup table on a server (e.g., server 140 of FIG. 1). The difficulty of reverse engineering the artifacts from the output signal may permit the detection of spectral artifacts as a secondary check to authenticate the key. For example, the target loss signal may be encrypted and stored in a different system from the reference data for the photonic device used during authentication of the photonic device (e.g., identifier information for the input signal, simulated output data, a schematic representation of the photonic device, etc.). Lacking the target loss signal, reverse engineering of the spectral artifacts 255 may present a significant challenge using only the output signal, the input signal, and the design of the photonic device. For example, where it may be relatively simple to prepare the difference signal 260 when provided the target loss signal, it may be challenging to determine the spectral artifacts 255 without being provided the target loss signal.

The spectral artifacts 255 that may be used to uniquely identify the photonic device may be attributable to defects introduced by the fabrication process. The defects may result from one or more features of the design having a size less than a threshold size at which defective fabrication is characterized by a relatively increased probability. The following illustrative embodiments describe aspects of photonic devices that permit the use of a metastructured dispersive region to apply one or more transformations to an input optical signal as part of generating an output optical signal with a unique spectral signature. The output optical signal, in turn, may be measured and applied to authenticating the photonic device using the unique spectral signature.

FIGS. 3A-3D illustrate different views of an example photonic device 300, in accordance with an embodiment of the present disclosure. The example photonic device 300 is realized as a photonic demultiplexer 320 and may include one possible implementation of the photonic device 101 illustrated in FIG. 1 and the photonic device 200 illustrated in FIG. 2A.

FIG. 3A illustrates a cross-sectional view of the demultiplexer 320 along a lateral plane within an active layer defined by a width 321 and a length 323 of the demultiplexer 320. As illustrated, the demultiplexer 320 includes an input region 310, a plurality of output regions 312, and a dispersive region 330 optically coupled with the input region 310 and the plurality of output regions 312. The input region 310 and the plurality of output regions 312 (e.g., 312-A-D) each may be optically coupled with the dispersive region 330 and may correspond to waveguides (e.g., slab waveguide, strip waveguide, slot waveguide, or the like) capable of propagating light along the path of the waveguide. The dispersive region 330 may include a first material and a second material (see, e.g., FIG. 3D) anisotropically distributed in the dispersive region 330 to form a plurality of interfaces that define a material interface pattern in the dispersive region 330, as described in more detail in reference to FIG. 4A. Each interface may correspond to a change in refractive index of the dispersive region 330. In the example of a demultiplexer, the interfaces may collectively structure the dispersive region 330 to optically separate each of a plurality of distinct wavelength channels from a multi-channel optical signal (e.g., input signal 230 of FIG. 2B) and respectively guide each of the plurality of distinct wavelength channels to a corresponding one of the plurality of output regions 312. As such, the input region 310 may be provided to couple an input optical signal (e.g., input optical signal 103 of FIG. 1), realized as a multi-channel optical signal including a plurality of distinct wavelength channels, into the dispersive region 330. Subsequent to applying a demultiplexing transformation, the plurality of output regions 312 may be provided to each receive one of the distinct wavelength channels demultiplexed from the multi-channel optical signal from the dispersive region 330. At least partially surrounding the dispersive region 330, a peripheral boundary region 322 may include the second material. In some embodiments, peripheral region 322 may be or include the second material and may be substantially free of the first material.

In some embodiments, the input region 310 and the output regions 312 may be or include the first material, the second material, or a third material different from the first material and the second material. In this way, the input region 310 and the output regions 312 may be optically coupled with the dispersive region using an index matching material, as an approach to reducing losses at the interface between the input and output regions and the dispersive region 330. In some embodiments, the input region 310 and the output regions 312 may be formed without a physical interface with the dispersive region 330, for example, where fabrication of the demultiplexer 320 includes removal of the first material and subsequent deposition of the second material (e.g., through an etch-deposition process compatible with SOI and/or CMOS manufacturing).

In the illustrated embodiment each of the plurality of output regions 312 are parallel to each other one of the output regions 312. The plurality of output regions 312 may diverge from one another. Similarly, while FIG. 3A illustrates each output region 312 being optically coupled with the second side 333, one or more of the plurality of output regions 312 and/or input region 310 may be disposed proximate to sides of dispersive region 330 that are adjacent to first side 331 and/or second side 333. An example of such an arrangement is illustrated in FIG. 2A. In some embodiments, the output regions 312 may be separated by a separation distance 314.

In a simplified example, the dispersive region 330 of demultiplexer 320 may be optically coupled with two output regions 312 (e.g., 312-A and 312-B) that are each respectively mapped (e.g., by virtue of the structure of dispersive region 330) to a respective one of the two channels included in an input signal. More specifically, the plurality of interfaces of dispersive region 330, defined by the anisotropic distribution of a first material and a second material, may form a material interface pattern that structures the dispersive region 330 to optically separate each of the two channels from the input signal and route each of the two channels to a respective one of the two output regions 312 when the input region 310 receives the input signal.

It is noted that the first material and second material of dispersive region 330 are arranged and shaped within the dispersive region such that the material interface pattern is substantially proportional to a design obtainable with an inverse design process, as described in more detail in reference to FIGS. 5-7. More specifically, in some embodiments, the inverse design process may include iterative optimization (e.g., gradient based or otherwise) of a design based at least in part on a loss function that incorporates a performance loss (e.g., to enforce functionality) and a fabrication loss (e.g., to enforce fabricability of the dispersive region including a first material and a second material) that is collectively reduced or otherwise adjusted iteratively until a design within target specifications that is also manufacturable is obtained.

The loss function may incorporate a fabrication loss that describes whether a design that otherwise meets target specifications is also manufacturable. In some embodiments, the fabrication loss is defined at least in part by parameters including, but not limited to, a particular manufacturing technique and/or system being used, as well as physical and/or chemical properties of the materials described in the design. In some cases, the likelihood that a feature will be defectively fabricated may increase nonlinearly below the threshold size, as described in more detail in reference to FIG. 4B.

The likelihood that a feature of the material interface pattern may be defectively fabricated, thereby deviating from the design of the dispersive region 330, may provide a source of spectral artifacts incorporated into an output optical signal (e.g., output optical signal 105 of FIG. 1). A relatively high defect density may impair the functionality of the dispersive region 330. As such, a minimum feature size may be defined to permit the inverse design process to converge to an optimized design, while also incorporating a given defect density, such that the output optical signal may include spectral artifacts and also provide an optimized output optical signal reproducing the target loss signal. In this way, the spectral artifacts and the output optical signal may collectively define the unique spectral signature of the photonic device (e.g., photonic device 101 of FIG. 1). The concepts of defect distribution, feature size, manufacturing defects, and spectral artifacts are described further in reference to FIGS. 4A-4C.

In some embodiments, the output optical signal generated by the dispersive region 330 may be designed to provide a first layer of authentication, where the spectral artifacts may permit the individual device to be identified. An optical reader device (e.g., optical reader device 107 of FIG. 1) may be used to detect the appropriate wavelength channels at the first output region 312-A and/or the second output region 312-B and to check the output signal for matching spectral artifacts.

Figure 3B:
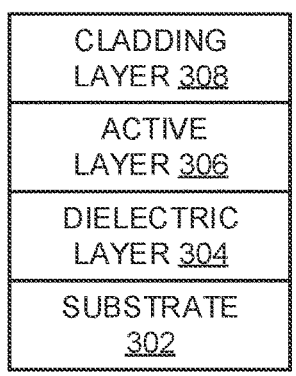
FIG. 3B illustrates an example photonic device, in accordance with an embodiment of the present disclosure.

FIG. 3B illustrates a vertical schematic or stack of various layers that are included in the illustrated embodiment of demultiplexer 320. However, it is appreciated that features or elements may be omitted to avoid obscuring aspects of the invention. In the illustrated embodiment, demultiplexer 320 includes substrate 302, dielectric layer 304, active layer 306 (e.g., as shown in the cross-sectional illustration of FIG. 3A), and a cladding layer 308. In some embodiments, demultiplexer 320 may be or be included in a photonic device that is compatible with conventional fabrication techniques (e.g., lithographic techniques such as photolithographic, electron-beam lithography and the like, sputtering, thermal evaporation, physical and chemical vapor deposition, and the like).

In one embodiment a silicon on insulator (SOI) wafer may be provided that includes sequentially stacked layers including a support substrate (e.g., a silicon substrate), a silicon dioxide layer, a silicon layer (e.g., doped silicon, undoped silicon, or otherwise). The support substrate of the SOI wafer may correspond to substrate 302. The silicon dioxide layer of the SOI wafer may correspond to dielectric layer 304. The silicon layer of the SOI wafer may be selectively etched by lithographically creating a pattern on the SOI wafer (e.g., directly on top of the silicon layer) that is transferred to the SOI wafer via a dry etch process (e.g., via a photoresist mask or any other mask) to remove portions of the silicon layer. The etched portions of the silicon layer included in the SOI wafer may subsequently be backfilled with silicon dioxide and planarized to form a patterned layer of silicon and silicon dioxide, which may collectively correspond to active layer 306. An oxide layer (e.g., silicon dioxide or otherwise) may be grown, deposited, or otherwise provided on top of the etched/backfilled silicon layer of the SOI wafer, which may correspond to cladding layer 308. It is appreciated that during the etch process, the silicon within active layer 306 may be selectively etched all the way down to dielectric layer 304 to form voids that may subsequently be backfilled with silicon dioxide, planarized, and then further encapsulated with silicon dioxide to form cladding layer 308. In one embodiment, formation of active layer 306 may include several etch depths including a full etch depth of the silicon to obtain the targeted structure. In one embodiment, the silicon may be 220 nm thick and thus the full etch depth may be 220 nm. In some embodiments, forming demultiplexer 320 may include a two-step encapsulation process in which two silicon dioxide depositions are performed with an intermediate chemical mechanical planarization used to yield a planar surface of active layer 306.

Figure 3C:
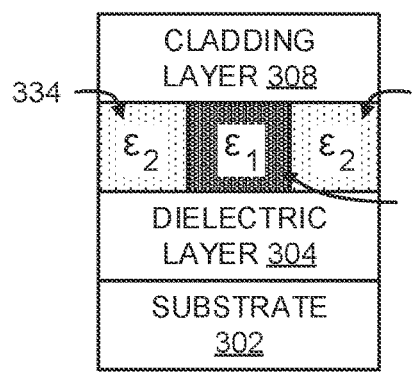
FIG. 3C illustrates an example photonic device, in accordance with an embodiment of the present disclosure.

FIG. 3C illustrates a more detailed view of active layer 306 (relative to FIG. 3B) taken along a portion of peripheral region 322 that includes input region 310 of FIG. 3A. In the illustrated embodiment, active region 306 includes a first material 332 with a refractive index of Li and a second material 334 with a refractive index of £2 that is different from Li. Homogenous regions of the first material 332 and the second material 334 may form waveguides or portions of waveguides that correspond to input region 310 and plurality of output regions 312 as illustrated in FIGS. 3A and 3C.

Figure 3D:
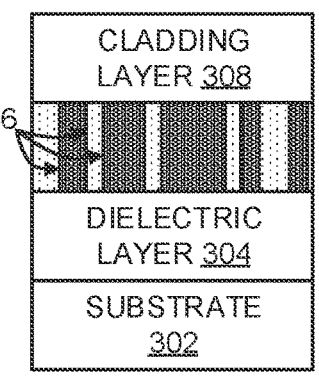
FIG. 3D illustrates an example photonic device, in accordance with an embodiment of the present disclosure.

FIG. 3D illustrates a more detailed view of active layer 306 (relative to FIG. 3B) taken along dispersive region 330. As described previously, dispersive region 306 includes a first material 332 (e.g., silicon) and a second material 334 (e.g., silicon dioxide) that are anisotropically distributed to form a plurality of interfaces 336 that collectively form a material interface pattern. Each of the plurality of interfaces 336 that form the interface pattern correspond to a change in refractive index of dispersive region 330 to structure the dispersive region (e.g., the shape and arrangement of first material 332 and second material 334) to provide the functionality of demultiplexer 320.

It is appreciated that in the illustrated embodiments of demultiplexer 320 as shown in FIGS. 3A-3D, the change in refractive index is shown as being vertically consistent (i.e., the first material 332 and second material 334 form interfaces that are substantially vertical or perpendicular to a lateral plane or cross-section of demultiplexer 320. However, in the same or other embodiments, the plurality of interfaces (e.g., interfaces 336 illustrated in FIG. 3D) may not be substantially perpendicular with the lateral plane or cross-section of demultiplexer 320.

Figure 4A:
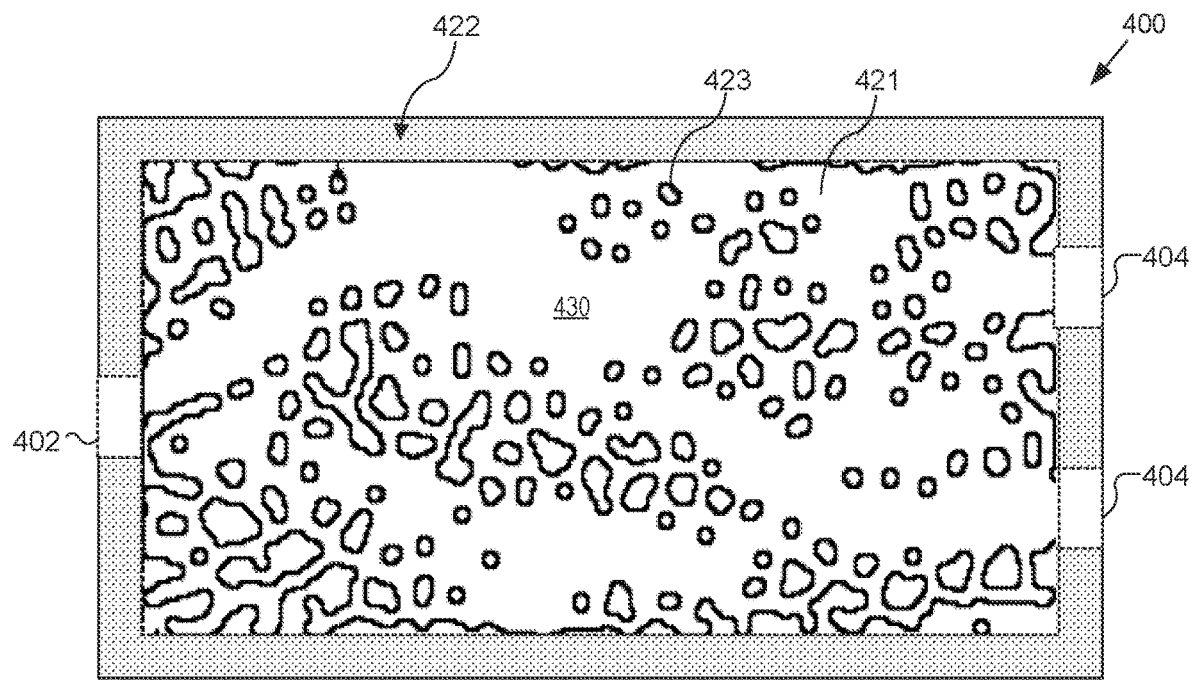
FIG. 4A illustrates a dispersive region of an example photonic device and corresponding interface pattern, in accordance with an embodiment of the present disclosure.

FIG. 4A illustrates a dispersive region of an example photonic device 400 and corresponding interface pattern, in accordance with an embodiment of the present disclosure. In some embodiments, the photonic device 400 includes an input region 402, a plurality of output regions 404 (e.g., two output regions include a first output region 404-A and a second output region 404-B), and the dispersive region 430 including a first material 421 and a second material 423. The photonic device 400 may include a peripheral region 422 (e.g., silicon dioxide or otherwise) disposed around at least a portion of the dispersive region 430. The dispersive region may define a material interface pattern within the dispersive region 430 formed by the arrangement of the first material 421 (e.g., silicon) and a second material 423 (e.g., silicon dioxide). The dispersive region 430 may be optically coupled with the input region 402 and the plurality of output regions 404.

The structure within the dispersive region 430 may include protrusions, islands, dendritic shapes, or other shapes and structures as illustrated. The structure within the dispersive region 430 may correspond to designs obtained from an inverse design process that implements iterative optimization. Combined simulation and optimization may permit a design to be generated to implement a targeted functionality (e.g., transfer function 210 of FIG. 2A). In this way, the design may be substantially replicated by dispersive region 430 within a proportional or scaled manner, such that photonic device 400 provides the targeted functionality.

Without sacrificing fidelity to the targeted functionality, the inverse design process may be calibrated to provide for a defect distribution in the dispersive region 430. The defect distribution may correspond to a subset of the features of the dispersive region that are defectively fabricated and randomly or pseudo-randomly distributed in the dispersive region 430. In this context, defective fabrication may describe a feature (e.g., an island, protrusion, dendritic structure, etc.) that deviates from the design of the dispersive region generated by the simulation and optimization techniques described. For example, a defective feature may be or include, an omitted feature (e.g., an island included in the design that is missing from the photonic device 400), a mis-sized feature (e.g., a feature that is larger or smaller than the corresponding feature size described in the design), or a misshapen feature.

Defects distributed in the dispersive region 430 may provide for a unique spectral signature of the photonic device 400, without impairing the targeted functionality of the dispersive region 430. In the context of the loss terms applied during optimization, the minimum feature size may be modified, or the optimization algorithm applied (e.g., gradient descent) may be tuned, such that the fabrication loss may be optimized, while also including the defect density that gives rise to spectral artifacts in the output signal(s) generated by the photonic device 400. For example, a minimum feature size may be defined that is less than a threshold size at which defect formation becomes probable. In addition, the fabrication loss may be defined such that the total number of features smaller than the threshold size is limited.

Figure 4B:
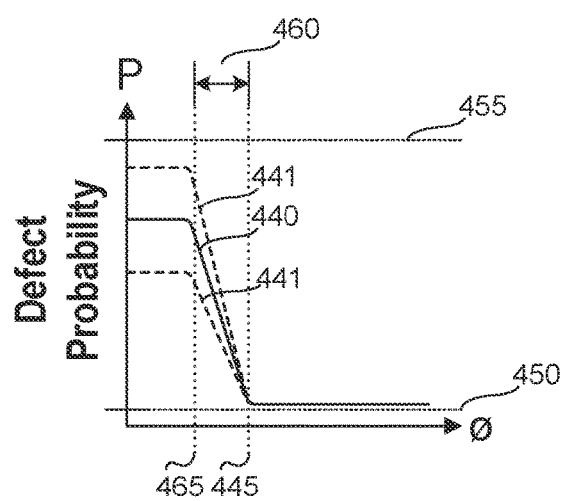
FIG. 4B illustrates a defect probability as a function of feature size for fabrication of an example dispersive region of an example photonic device, in accordance with an embodiment of the present disclosure.

FIG. 4B illustrates a defect probability curve 440 as a function of feature size for fabrication of an example dispersive region of an example photonic device, in accordance with an embodiment of the present disclosure. The defect probability, expressed as a likelihood of a feature being defectively fabricated as a function of feature size "0" provides a conceptual description in the context of the design and fabrication of photonic devices described herein. In practice, such information may be unavailable and the fabrication system may provide a minimum size for features, rather than a continuous defect probability function. In some embodiments, for which fabrication defects are to be avoided, a threshold feature size 445 may be defined such that the features of the design will be faithfully reproduced. In this way, the threshold feature size 445 may correspond to the smallest feature size at which the defect probability is substantially equal to a minimum defect probability 450.

In some embodiments, a design for the dispersive region of a photonic device may include features smaller than the threshold feature size 445, such that the defect probability may increase from the minimum defect probability 450 such that the probability curve 440 exhibits a transition region 460 in the defect probability for features smaller than the threshold feature size 445. In some embodiments, the lower limit of the transition region 460 may correspond to a limit feature size 465, below which fabrication may be forbidden by the relevant system, or where the feature size may be physically meaningless.

While the defect probability curve 440 is illustrated as a deterministic dependency on feature size alone, implying that the probability that a feature will be defectively fabricated can be known with certainty, the likelihood of defect formation may depend on multiple factors. Factors that may influence the defect probability curve 440 may include, but are not limited to, design considerations (e.g., the materials and shapes employed in the design) and/or fabrication system considerations (e.g., the fabrication system may be more likely to defectively fabricate some features than others of the same or substantially equal size). In this way, the likelihood that a particular feature smaller than the threshold feature size 445 will be defectively fabricated may be random or random within a range of values, as indicated by the dashed lines 441. For example, while feature size may exhibit a relatively large influence on the defect probability, other factors may also influence the defect probability in unforeseeable ways, introducing randomness into the fabrication of features below the threshold feature size 445.

In some embodiments, a subset of the features that collectively define the material interface pattern of the dispersive region 430 may fall within the range of feature sizes covered by the transition region 460. While retaining the targeted functionality, the design process of the photonic device 400 may include the subset of features, as an approach to incorporating a random defect distribution in the dispersive region 430. In this way, at least a fraction of the subset of features may be defectively fabricated and the photonic device may thereby generate the unique spectral signature described in reference to FIGS. 2A-3D.

Figure 4C:
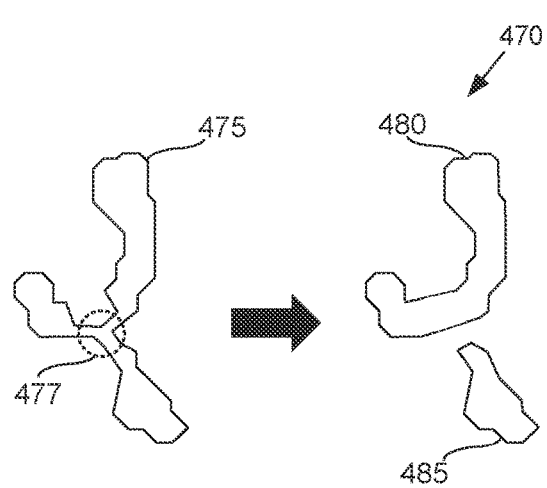
FIG. 4C illustrates an example fabrication defect in an example material interface pattern, in accordance with an embodiment of the present disclosure.

FIG. 4C illustrates an example fabrication defect 470 in an example material interface pattern, in accordance with an embodiment of the present disclosure. As an illustrative example, fabrication defect 470 may result when a feature 475 in the design of the dispersive region (e.g., an island) may include a portion 477 characterized by a dimension smaller than the threshold feature size 445. As such, in the manufactured photonic device, the feature 475 may be fabricated with the portion 477 at least partially omitted and/or enlarged, resulting in a first island 480 and a second island 485. It is noted that while the fabrication defect 470 defect is clear in the simplified illustration of FIG. 4C, the presence of a similar defect may present a significant challenge to identify in a realized photonic device as part of reverse engineering the design. Furthermore, the introduction of the fabrication defect 470 may have a limited or substantially negligible impact on the targeted functionality of the photonic device. Advantageously, the fabrication defect 470 may introduce a spectral artifact (e.g., spectral artifact 255 of FIG. 2C) into the output signal of the photonic device.

In some embodiments, therefore, the inverse design process may include optimization parameters that permit the incorporation of one or more defects into the dispersive region of the photonic device. The defects may be distributed in the dispersive region, such that the photonic device maintains its targeted functionality, while also including spectral artifacts that collectively create a unique spectral signature for the device.

FIG. 5 is a functional block diagram illustrating a system for generating a design of a photonic integrated circuit, in accordance with an embodiment of the present disclosure. System 500 may be utilized to perform the inverse design process. More specifically, system 500 is a design tool that may be utilized to optimize structural parameters (e.g., shape and arrangement of a first material and a second material within the dispersive region of the embodiments described in the present disclosure) of photonic integrated circuits based on first-principles simulations (e.g., electromagnetic simulations to determine a field response of the photonic device to an excitation source) and iterative optimization. In other words, system 500 may provide a design obtained via the inverse design process that is substantially replicated (e.g., proportionally scaled) by dispersive regions 330 and 430 of photonic devices 300 and 400 illustrated in FIGS. 3A and 4A, respectively.

As illustrated, system 500 includes controller 505, display 507, input device(s) 509, communication device(s) 511, network 513, remote resources 515, bus 521, and bus 523.

Controller 505 includes processor 531, memory 533, local storage 535, and photonic device simulator 539. Photonic device simulator 539 includes operational simulation engine 541, fabrication loss calculation logic 543, calculation logic 545, adjoint simulation engine 547, and optimization engine 549. It is appreciated that in some embodiments, controller 505 may be a distributed system.

Controller 505 is coupled to display 507 (e.g., a light emitting diode display, a liquid crystal display, and the like) coupled to bus 521 through bus 523 for displaying information to a user of system 500 to optimize structural parameters of the photonic device. Input device 509 is coupled to bus 521 through bus 523 for communicating information and command selections to processor 531. Input device 509 may include a mouse, trackball, keyboard, stylus, or other computer peripheral, to facilitate an interaction between the user and controller 505. In response, controller 505 may provide verification of the interaction through display 507.

Another device, which may optionally be coupled with controller 505, is a communication device 511 for accessing remote resources 515 of a distributed system via network 513. Communication device 511 may include a number of networking peripheral devices such as those used for coupling with an Ethernet, Internet, or wide area network, and the like. Communication device 511 may further include a mechanism that provides connectivity between controller 505 and the outside world. The components of system 500 illustrated in FIG. 5 and associated hardware may be used in various embodiments of the present disclosure. The remote resources 515 may be part of a distributed system and include any number of processors, memory, and other resources for optimizing the structural parameters of the photonic device.

Controller 505 orchestrates operation of system 500 for optimizing structural parameters of the photonic device. Processor 531 (e.g., one or more central processing units, graphics processing units, and/or tensor processing units, etc.), memory 533 (e.g., volatile memory such as DRAM and SRAM, non-volatile memory such as ROM, flash memory, or the like), local storage 535 (e.g., magnetic memory such as computer disk drives), and the photonic device simulator 539 are coupled to each other through bus 523. Controller 505 includes software (e.g., instructions included in memory 533 coupled with processor 531) and/or hardware logic (e.g., application specific integrated circuits, field-programmable gate arrays, or the like) that when executed by controller 505 causes controller 505 or system 500 to perform operations. The operations may be based on instructions stored within one or a combination of memory 533, local storage 535, physical device simulator 539, and remote resources 515 accessed through network 513.

In some embodiments, modules 541-549 of photonic device simulator 539 are utilized to optimize structural parameters of the photonic device (e.g., photonic device 101 of FIG. 1, photonic device 200 of FIG. 2A, demultiplexer 320 of FIGS. 3A-3D, and photonic device 400 of FIG. 4A). In some embodiments, system 500 may optimize the structural parameters of the photonic device via, inter alia, simulations (e.g., operational and adjoint simulations) that utilize a finite-difference time-domain (FDTD) method to model the field response (e.g., electric and magnetic fields within the photonic device). The operational simulation engine 541 may provide instructions for performing an electromagnetic simulation of the photonic device operating in response to an excitation source within a simulated environment. In particular, the operational simulation may determine a field response of the simulated environment (and thus the photonic device, which is described by the simulated environment) in response to the excitation source for determining a performance metric of the physical device (e.g., based off an initial description or input design of the photonic device that describes the structural parameters of the photonic device within the simulated environment with a plurality of voxels). The structural parameters may correspond, for example, to the specific design, material compositions, and/or dimensions of the physical device. Fabrication loss calculation logic 543 may provide instructions for determining a fabrication loss, which may be applied to apply a minimum feature size and/or shape to ensure fabricability. In some embodiments, the fabrication loss may be used to apply a binarization of the design (i.e., such that the photonic device includes a first material and a second material that are interspersed to form a plurality of interfaces). In some embodiments, the fabrication loss may also be used to provide a subset of features smaller than a threshold feature size, below which the likelihood of defective fabrication increases, as described in more detail in reference to FIGS. 4A-C.

Calculation logic 545 may compute a loss metric determined via a loss function that incorporates a performance loss, based on the performance metric, and the fabrication loss. Adjoint simulation engine 547 is utilized in conjunction with the operational simulation engine 541 to perform an adjoint simulation of the photonic device to backpropagate the loss metric through the simulated environment via the loss function to determine how changes in the structural parameters of the photonic device influence the loss metric. Optimization engine 549 is utilized to update the structural parameters of the photonic device to reduce the loss metric and generate a revised description (i.e., revising the design) of the photonic device.

FIG. 6 shows an example method 600 for generating a design of a photonic device, in accordance with an embodiment of the present disclosure. It is appreciated that method 600 may be accomplished by performing operations with a system (e.g., system 500 of FIG. 5) to perform iterative optimization of a design of a photonic device. A photonic device designed by the method 600 may be or include a metastructure (e.g., dispersive region 330 of FIG. 3A, dispersive region 430 of FIG. 4A, or the like) that permits the photonic device to implement a target functionality, as described in reference to FIGS. 2A-2C.

Block 610 illustrates receiving, accessing, or otherwise obtaining an initial design of a photonic device, including a dispersive region. The initial design of the photonic device may include a random or pseudorandom distribution of materials within the dispersive region and may be defined with boundary conditions describing various physical aspects of the photonic device (e.g., peripheral region 322, input region 310, and output regions 312 of FIG. 3A). The initial design for the photonic device may include a random or pseudo-random distribution of a first material (e.g., silicon) and a second material (e.g., silicon oxide) in a design region describing the dispersive region of the photonic device. Random distribution of the materials in discretized voxels within the design region may reduce bias in the optimization process, as one approach to converging to a global minimum as opposed to a local minimum in the parameter space.

In addition, the initial design for the multiplexer may include input and output regions described in terms of spatial dimensions (e.g., location and size) and/or physical/material properties (e.g., index of refraction). For example, the input and/or output regions may be or include a first material (e.g., first material 421 of FIG. 4A), while the peripheral region may be or include a second material or a third material (e.g., second material 423 of FIG. 4A), as an exemplary approach to providing a particular boundary condition (e.g., reflective boundary, absorptive boundary, etc.).

Block 615 illustrates receiving, accessing, or otherwise obtaining, a target loss signal. The target loss signal may provide the optimization target for the iterative design process of block 620. The target loss signal may describe a difference signal between a target output signal and a particular input signal. As described in more detail in reference to FIG. 2C, the target loss signal may describe an attenuation in dB as a function of wavelength. Additionally or alternatively, the target loss signal may describe attenuation as a function of mode number or electromagnetic mode, phase shift, polarization, as well as other signal parameters. In some embodiments, the target loss signal excludes the spectral artifacts described in reference to FIG. 2C. Advantageously, such an approach may permit different photonic devices to be designed using the same target loss signal that may each have unique spectral signatures, owing to the random or pseudo-random distribution of defects in the dispersive region and the resulting random introduction of spectral artifacts into the output signal of the dispersive region.

In some embodiments, alternatives to receiving the target loss signal may include, but are not limited to, receiving a target output signal or receiving a transfer function or transformation (e.g., transfer function 210 of FIG. 2A). In this way, the method 600 may optionally include determining the target loss signal from the received information, such that the iterative design process may optimize the loss signal of the simulated photonic device. In an illustrative example, the design process of method 600 may include receiving a transformation described in terms of parametric configuration information, rather than a loss signal. The parametric configuration information may include a transformation type and parameters, such as "bandpass filter," an upper cutoff wavelength value, a lower cutoff wavelength value, and an attenuation magnitude (e.g., in terms of dB or percent). It is understood that many transformations may be described by additional parameters (e.g., for bandpass filters, a shape factor, Q-factor, etc., may be specified). With this information, the method 600 may include additional operations to generate a target loss signal describing the attenuation of the input optical signal, for example, as a function of wavelength.

Block 620 illustrates generating a new design of the dispersive region of the photonic device. As described in more detail in reference to FIG. 7, the iterative process of method 600 may include an inverse design process, by which the design of the photonic device received at block 610 may be simulated and optimized over multiple design iterations, until a simulated loss signal for the design converges to the target loss signal. Being an iterative process, the method 600 may include multiple cycles of the operations of block 620, such that the new design of the photonic device may represent the last of a sequence of intermediate designs that did not satisfy one or more convergence criteria.

The loss function, as described in more detail in reference to FIG. 7, may include a fabrication loss term, which may represent the fabricability of the design. As described in more detail in reference to FIG. 4B, the fabricability of the design may depend, at least in part, on the characteristic dimensions of the features making up the dispersive region. For example, the likelihood that a feature may be defectively fabricated may increase when the size of the feature is less than a threshold size. The threshold size, in turn, may depend on the materials being used, the fabrication system employed, the operating spectrum of the device (e.g., ultraviolet, visible, infrared, microwave, etc.). In this way, the operations of block 620 may include generating the new design such that it incorporates a subset of features having a size less than the threshold feature size. The subset of features may, therefore, be characterized by a random distribution of defectively fabricated features.

Block 625 illustrates outputting the new design of the photonic device and may include one or more operations to output the new design to one or more systems. For example, the operations of the method 600 may be executed by one or more computers (e.g., a personal computer, a distributed computer system over a network, a mobile electronic device, etc.). In this way, outputting the new design may include generating visualizations and simulation output of the new design and presenting the visualizations and simulation output via a display. Outputting may also include, but is not limited to, outputting the new design to a fabrication system configured to manufacture a photonic device according to the new design. For example, the fabrication system may be in communication with the computer system executing the operations of the method 600 over a network. As such, the computer system may generate and/or send the new design as a fabrication instruction (e.g., a design file) to the fabrication system.

FIG. 7 shows an example method 700 for optimizing a design of a photonic device (e.g., photonic device 101 of FIG. 1, photonic device 200 of FIG. 2A, photonic device 300 of FIG. 3A, photonic device 400 of FIG. 4A), in accordance with an embodiment of the present disclosure. It is appreciated that method 700 is an inverse design process that may be accomplished by performing operations with a system (e.g., system 500 of FIG. 5) to perform iterative optimization of a loss metric determined from a loss function that includes a performance loss and a fabrication loss. The operations of the method 700 may be executed as part of the method 600, described in reference to FIG. 6. A detailed description of an inverse design process including mathematical formulations and description of backpropagation algorithms is provided in U.S. Pat. No. 10,862,610, to Schubert, et al. The inverse design process of Schubert, et al. differs from the method 700 at least with respect to the enforcement of a minimum feature size to avoid defective fabrication. Nonetheless, the general principles of inverse design are described with additional detail, and, as such, the disclosure of Schubert et al is incorporated by reference herein in its entirety.

Block 710 illustrates configurating a simulated environment to be representative of an initial description of a photonic integrated circuit (e.g., photonic device) that has been received, accessed, or otherwise obtained. In some embodiments, the photonic integrated circuit may be expected to exhibit a target functionality after optimization. The simulated environment may include a plurality of voxels that collectively describe the structural parameters of the photonic device. Each of the plurality of voxels is associated with a structural value to describe the structural parameters, a field value to describe the field response (e.g., the electric and magnetic fields in one or more orthogonal directions) to physical stimuli (e.g., one or more excitation sources), and/or a source value to describe the physical stimuli.

Once the initial description has been received or otherwise obtained, the simulated environment may be configured (e.g., the number of voxels, shape/arrangement of voxels, and specific values for the structural value, field value, and/or source value of the voxels are set based on the initial description). In some embodiments the initial description may be a first description of the physical device in which values for the structural parameters may be random values or null values outside of input and output regions such that there is no bias for the initial (e.g., first) design. It is appreciated that the initial description or input design may be a relative term. The term "initial description" may refer to an initial description of a particular cycle (e.g., of performing an operational simulation, operating an adjoint simulation, and updating the structural parameters). In such an embodiment, the initial description or design of a particular cycle may correspond to a revised description or refined design (e.g., generated from a previous cycle). The simulated environment may include a design region that includes a portion of the plurality of voxels which have structural parameters that may be updated, revised, or otherwise changed to optimize the structural parameters of the photonic device. In the same or other embodiments, the structural parameters are associated with geometric boundaries and/or material compositions of the physical device based on the material properties (e.g., relative permittivity, index of refraction, etc.) of the simulated environment.

In some embodiments, the simulated environment may include a design region optically coupled between a first communication region and a second communication region. In some embodiments, the first communication region may correspond to an input region or port (e.g., where an excitation source originates), while the second communication region may correspond to one or more output regions or ports.

Block 715 illustrates performing an operational simulation of the photonic integrated circuit within the simulated environment operating in response to one or more excitation sources to determine a performance metric. More specifically, an electromagnetic simulation is performed in which a field response of the photonic integrated circuit is updated incrementally over a plurality of time steps to determine how the field response of the simulated device changes due to the excitation source. The field values of the plurality of voxels are updated in response to the excitation source and based, at least in part, on the structural parameters of the integrated photonic circuit. Additionally, each update operation at a particular time step may also be based, at least in part, on a previous (e.g., immediately prior) time step.

Consequently, the operational simulation simulates an interaction between the photonic device and one or more physical stimuli to determine a simulated output of the photonic device (e.g., at one or more of the output ports or regions) in response to the physical stimuli. The interaction may correspond to electromagnetic physical phenomena including, but not limited to, perturbation, retransmission, attenuation, dispersion, refraction, reflection, diffraction, absorption, scattering, or amplification, alone or in combination, in accordance with the structural parameters of the photonic device and underlying physics governing operation of the photonic device. Thus, the operational simulation simulates how the field response of the simulated environment changes in response to the excitation source over a plurality of time steps (e.g., from an initial time step to a final time step with a pre-determined step size).

As illustrated at Block 720, in some embodiments, the simulated output may be utilized to determine one or more performance metrics of the photonic integrated circuit. In the example of the photonic device, during the operational simulation, the field response at the output port may then be utilized to determine a simulated loss signal for a selected input optical signal. In this case, the simulated loss signal may be compared to the target loss signal and used to determine the performance metric.

Block 725 shows determining a loss metric based on a performance loss associated with a performance metric and a fabrication loss associated with a minimum feature size. In some embodiments the loss metric may be determined via a loss function that includes both the performance loss and the fabrication loss as input values. The performance loss may correspond to a difference between the performance metric and a target performance metric of the photonic integrated circuit. In some embodiments, a minimum feature size for the design region of the simulated environment may be provided to promote fabricability of the design generated by the inverse design process. The fabrication loss may be based, at least in part, on the minimum feature size and the structural parameters of the design region. More specifically, the fabrication loss may enforce the minimum feature size for the design such that the design region does not have structural elements with a characteristic dimension less than the minimum feature size. This helps this system provide designs that meet certain fabricability and/or yield requirements. The minimum feature size may include a minimum feature shape. The minimum feature size may be smaller than a threshold feature size below which the probability of defective fabrication increases, such that the design incorporates randomly or pseudo-randomly distributed defects.

In some embodiments, the design generated by the inverse design process optimizes at least one of the first material (e.g., first material 421 of FIG. 4A) or the second material (e.g., second material 423 of FIG. 4A) to be structured within the design region (e.g., dispersion region 430 of FIG. 4A) to be schematically reproducible by a feature shape with a predetermined width. For example, the shape and arrangement of the first material and/or the second material within the design region may be reproduced (e.g., drawn) with a brush having a size that corresponds to the feature shape and a width corresponding to the predetermined width. In one embodiment, the feature shape includes at least one of a circle, a square, a hexagon, an octagon, or any other shape. In some embodiments, the feature shape is a singular shape that may be rotated, flipped, and/or overlapped with a portion of another feature shape. For example, if the feature shape is an octagon, two overlapping octagons each corresponding to the feature shape may partially overlap one another to produce a different shape. In other embodiments, the feature shape may be or include an indivisible unit that does not overlap, but rather may be tessellated to form the interface pattern. In some embodiments the feature shape and the predetermined width of the feature shape may correspond to the minimum feature size of the design (e.g., minimum feature size 465 of FIG. 4B).

In some embodiments the fabrication loss may be determined by generating a convolution kernel (e.g., circular, square, octagonal, or otherwise) with a width equal to the minimum feature size. The convolution kernel may then be shifted through the design region of the simulated environment to determine voxel locations (i.e., individual voxels) within the design region that fit the convolution kernel within the design region without extending beyond the design region. The convolution kernel may then be convolved at each of the voxel locations with the structural parameters associated with the voxel locations to determine first fabrication values. The structural parameters may be inverted and the convolution kernel may be convolved again at each of the voxel locations with the inverted structural parameters to determine second fabrication values. The first and second fabrication values may be subsequently combined to determine the fabrication loss for the design region. This process of determining the fabrication loss may promote structural elements of the design region having a radius of curvature less than a threshold size (e.g., the inverse of half the minimum feature size).

Block 730 illustrates backpropagating the loss metric via the loss function through the simulated environment to determine an influence of changes in the structural parameters on the loss metric (e.g., the structural gradient). The loss metric may be treated as an adjoint or virtual source and may be backpropagated incrementally from a final time step to earlier time steps in a backwards simulation to determine the structural gradient of the photonic integrated circuit.

Block 735 shows revising a design of the photonic integrated circuit by updating the structural parameters to adjust the loss metric. In some embodiments, adjusting for the loss metric may reduce the loss metric. However, in other embodiments, the loss metric may be adjusted or otherwise compensated in a manner that does not necessarily reduce the loss metric, In one embodiment, adjusting the loss metric may maintain fabricability while providing a general direction within the parameterization space to obtain designs that will ultimately result in increased performance while also maintaining device fabricability, defect density, and targeted performance metrics.

In some embodiments, the revised description may be generated by utilizing an optimization scheme after a cycle of operational and adjoint simulations via a gradient descent algorithm, Markov Chain Monte Carlo algorithm, or other optimization techniques. In some embodiments, iterative cycles of simulating the photonic integrated circuit, determining a loss metric, backpropagating the loss metric, and updating the structural parameters to adjust the loss metric may be successively performed until the loss metric substantially converges such that the difference between the performance metric and the target performance metric is within a threshold range while also accounting for fabricability and defect density due to the fabrication loss.

Block 740 illustrates determining whether the loss metric substantially converges such that the difference between the performance metric and the target performance metric is within a threshold range. In some embodiments, the structural parameters of the design region of the integrated photonic circuit may be revised when performing the cycles to impart the target functionality to the design region of the photonic integrated circuit (e.g., transfer function 210 of FIG. 2A).

Block 745 illustrates outputting an optimized design of the photonic integrated circuit in which the structural parameters have been updated.

Figure 8:
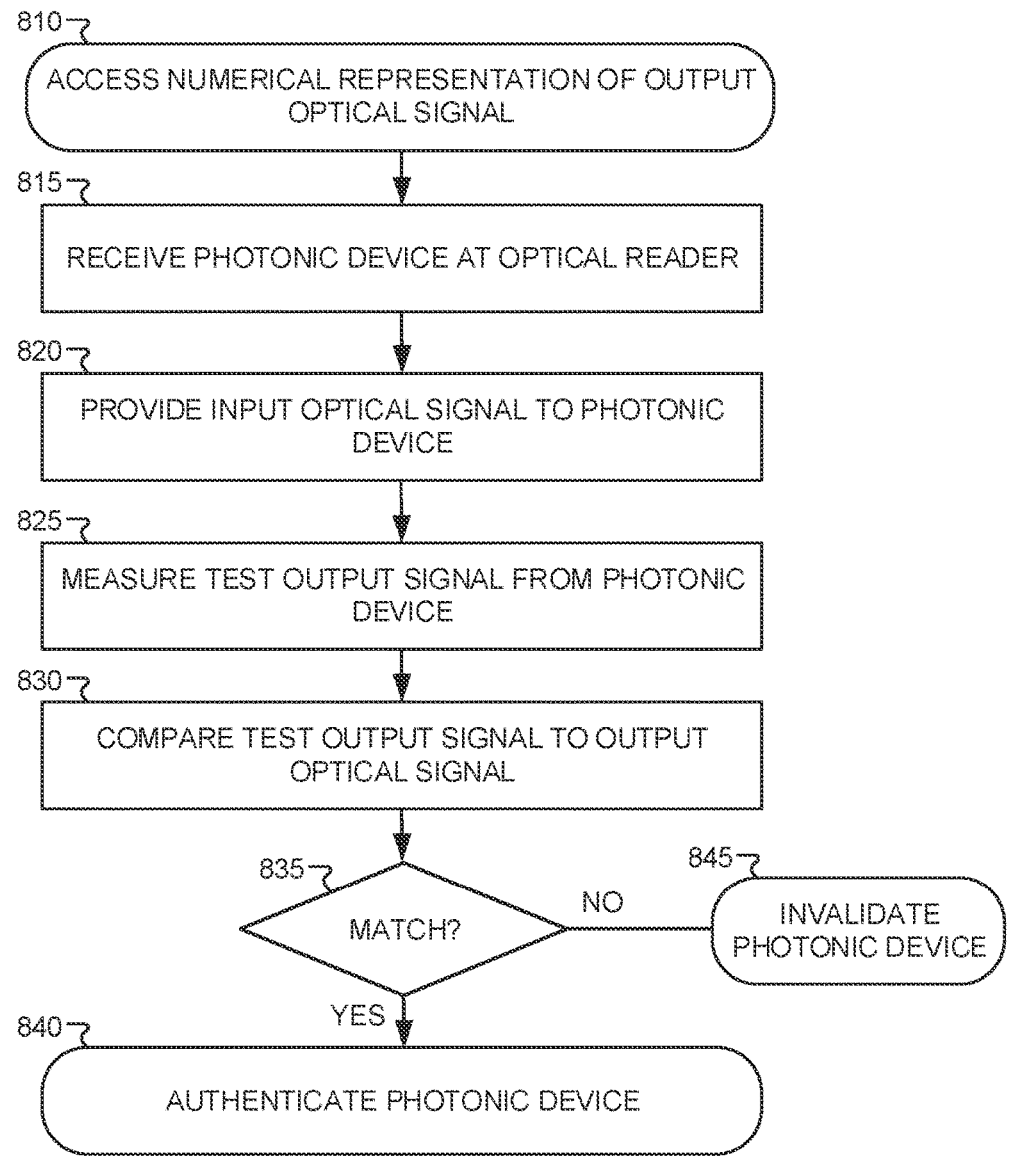
FIG. 8 shows an example method for authenticating a photonic device using an optical reader, in accordance with an embodiment of the present disclosure.

FIG. 8 shows an example method 800 for authenticating a photonic device using an optical reader, in accordance with an embodiment of the present disclosure. As described in more detail in reference to FIG. 1, applications of the photonic device (e.g., photonic device 101 of FIG. 1) may include, but are not limited to, interrogation of the photonic device by an input optical signal (e.g., input optical signal 103 of FIG. 1) from an optical reader (e.g., optical reader device 107 of FIG. 1) to authenticate the photonic device. Authentication may include checking that the photonic device generates the correct output optical signal (e.g., output optical signal 105 of FIG. 1, output signal 215 of FIG. 2A). Authentication may also include identifying spectral artifacts (e.g., spectral artifacts 255 of FIG. 2C) incorporated into the output optical signal that collectively define a unique spectral signature of the photonic device.

Block 810 illustrates accessing a numerical representation of the output optical signal. The term "numerical representation" is used to indicate spectrum data. Accessing the numerical representation of the output optical signal may include receiving a measured output optical signal of the photonic device that may include the unique spectral signature of the photonic device.

The method 800 may include additional operations to simulate the numerical representation of the output optical signal. For example, the method 800 may include receiving a schematic description of the dispersive region. The schematic description may include dimensions and material properties of the photonic device, including a description of the dispersive region (e.g., dispersive region 430 of FIG. 4A). Additionally, the method 800 may include receiving a numerical representation of the input optical signal. Using the numerical representation of the input optical signal and the schematic description of the dispersive region, the method 800 may include predicting the numerical representation output optical signal, for example, by simulating the interaction of the input optical signal with the photonic device.

Block 815 illustrates receiving a photonic device at an optical reader. As described in more detail in reference to FIG. 1, the optical reader may include one or more light sources and light sensors. In this way, the operations of block 815 may include, but are not limited to, bringing the photonic device into optical communication with the optical reader. In some embodiments, the photonic device may move into the proximity of the optical reader (e.g., as part of a logistics system where the photonic device is borne by an object that moves past the optical reader). In some embodiments, the optical reader may be or include a portable electronic device (e.g., a handheld optical scanner), such that the operations of block 815 may include positioning the optical reader relative to the photonic device to optically couple the optical reader with the photonic device.

Blocks 820 and 825 illustrate operations including providing the input optical signal to the photonic device and measuring a test output signal from the photonic device. As described in more detail in reference to FIG. 2A-C, the photonic device may be designed to generate multiple output signals. In this way, block 820 may optionally include selecting an input optical signal from a number of input optical signals that the photonic device has been designed to receive. For example, the optical reader may identify the photonic device using a first identification procedure (e.g., by ascertaining an identifier, such as a serial number, of the photonic device). With the identification information, the optical reader may access a database storing the parametric information of the input optical signals that the photonic device is designed to receive. It is understood that the optional operations described may occur prior to at least some of the preceding operations of the method 800.

In some embodiments, measuring the test output signal from the photonic device may include measuring multiple test output signals. Each of the output signals may subsequently be used to authenticate the photonic device, as each of the output signals may correspond to a different loss signal and may include different spectral artifacts.

Block 830 illustrates a comparison of the measured test output signal to the output optical signal. Alternatively, the comparison of block 830 may include generating a target loss spectrum using data received at block 810 and a measured loss spectrum using data received at block 825. As such, the operations of block 830 may optionally include identifying spectral artifacts in the test optical signal and comparing the spectral artifacts to metadata stored in association with the photonic device (e.g., associated with an identifier of the photonic device in a server, such as server 140 of FIG. 1). In some embodiments, the comparison may include ascertaining a statistical fit metric, describing the extent to which the test output signal fits the output optical signal.

Decision block 835 illustrates determining whether the test output signal measured by the optical reader at block 825 matches the output optical signal received at block 810, and, as such, whether the photonic device is authentic. The operations of decision block 835 may include, but are not limited to, comparing the fit metric to a threshold fit value, comparing the spectral artifacts identified in the test optical signal to those identified in the metadata describing the photonic device, or other approaches for identifying the unique spectral signature of the photonic device.

Subsequent decision block 835, blocks 840 and 845 illustrate disposition of the method 800, either as an authentication response or an invalidation response. In some embodiments, the method 800 may include providing a visual indication of the disposition (e.g., "device authenticated," "invalid key," etc.), and/or generating an instruction to an associated system (e.g., server 140 of FIG. 1) to authorize or deny access to the area or resource.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

In some embodiments, methods (e.g., method 600 of FIG. 6, method 700 of FIG. 7, and method 800 of FIG. 8, may be included as instructions provided by at least one machine-accessible storage medium (e.g., non-transitory memory) that, when executed by a one or more processors of a machine, will cause the machine to perform operations for generating the design of the photonic integrated circuit. It is further appreciated that the order in which some or all of the process blocks appearing in the methods should not be deemed limiting. Rather, one of ordinary skill in the art having the benefit of the present disclosure will understand that some of the process blocks may be executed in a variety of orders not illustrated, in parallel, or may be omitted from the method.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A photonic device, comprising:
   an input region configured to receive an input optical signal;
   a dispersive region optically coupled with the input region to receive the input optical signal, wherein the dispersive region includes an anisotropic distribution of a first material and a second material to form a plurality of interfaces that each correspond to a change in a refractive index of the dispersive region, wherein the plurality of interfaces collectively structure the dispersive region to generate an output optical signal from the input optical signal; and
   an output region, optically coupled with the dispersive region to receive the output optical signal,
   wherein the plurality of interfaces forms a material interface pattern in the dispersive region that is characterized by a defect distribution to introduce one or more spectral artifacts into the output optical signal that collectively define a unique spectral signature of the photonic device,
   wherein the input region corresponds to a first waveguide and the output region corresponds to a second waveguide, and wherein a lateral plane of the photonic device includes the first waveguide, the second waveguide, and the dispersive region.

2. The photonic device of claim 1, wherein the defect distribution corresponds to manufacturing defects introduced during fabrication of the photonic device.

3. The photonic device of claim 1, wherein the material interface pattern includes a plurality of features, wherein a first feature included in the plurality of feature is formed of the first material and surrounded by the second material, and wherein a second feature included in the plurality of features is formed of the second material and surrounded by the first material.

4. The photonic device of claim 3, wherein the defect distribution corresponds to a subset of the plurality of features having a feature size below a threshold size, and wherein a random distribution of the subset of the plurality of features are defectively fabricated.

5. The photonic device of claim 1, wherein the output region is a first output region, wherein the output optical signal is a first optical signal, and wherein the photonic device further comprises:
   a second output region, different from the first output region, optically coupled with the dispersive region to receive a second output optical signal, the second output optical signal being different from the first output optical signal, wherein the second output optical signal comprises one or more spectral artifacts introduced by the defect distribution, and wherein the dispersive region is configured to generate the first output optical signal and the second output optical signal from the input optical signal.

6. The photonic device of claim 1, wherein the dispersive region is structured to act as a wavelength selective filter.

7. The photonic device of claim 1, wherein the dispersive region is structured to reduce a number of optical modes between the input optical signal and the output optical signal.

8. The photonic device of claim 1, wherein the dispersive region is structured to attenuate the input optical signal.

9. The photonic device of claim 1, wherein the dispersive region is configured to generate the output optical signal from the input optical signal at an operating temperature, and wherein the dispersive region is configured not to generate the output optical signal at a temperature different from the operating temperature.

10. The photonic device of claim 1, further comprising:
an input optical coupler, optically coupled with the input region to receive the input optical signal from an optical reader device; and
an output optical coupler, optically coupled with the output region to provide the output optical signal to the optical reader device.

11. The photonic device of claim 10, wherein the photonic device further comprises a thermal circuit thermally coupled with the dispersive region to maintain an operating temperature of the dispersive region.

12. The photonic device of claim 1, wherein the first material includes silicon and the second material includes silicon oxide.

13. The photonic device of claim 1, wherein the lateral plane of the photonic device includes the dispersive region disposed between the first waveguide and the second waveguide.

14. The photonic device of claim 1, wherein the dispersive region includes a planar layer, wherein the planar layer includes the anisotropic distribution of the first material and the second material to form the plurality of interfaces disposed between a cladding layer and a dielectric layer.

15. A photonic device, comprising:
an input region configured to receive an input optical signal;
a dispersive region optically coupled with the input region to receive the input optical signal, wherein the dispersive region includes a first material and a second material anisotropically distributed to form a plurality of interfaces that each correspond to a change in a refractive index of the dispersive region, wherein the plurality of interfaces collectively structures the dispersive region to generate an output optical signal from the input optical signal; and
an output region, optically coupled with the dispersive region to receive the output optical signal,
wherein the plurality of interfaces forms a material interface pattern in the dispersive region that is characterized by a defect distribution to introduce one or more spectral artifacts into the output optical signal that collectively define a unique spectral signature of the photonic device, and
wherein the dispersive region is structured to modify the input optical signal by applying one or more transfer functions to the input optical signal to generate the output optical signal that corresponds to an output of the one or more transfer functions.

16. The photonic device of claim 15, wherein the photonic device is a photonic demultiplexer.

17. The photonic device of claim 15, wherein the photonic device is a mode selector or a mode separator.

18. A photonic device, comprising:
an input region configured to receive an input optical signal;
a dispersive region optically coupled with the input region to receive the input optical signal, wherein the dispersive region includes a first material and a second material anisotropically distributed to form a plurality of interfaces that each correspond to a change in a refractive index of the dispersive region, wherein the plurality of interfaces collectively structures the dispersive region to generate an output optical signal from the input optical signal; and
an output region, optically coupled with the dispersive region to receive the output optical signal,
wherein the plurality of interfaces forms a material interface pattern in the dispersive region that is characterized by a defect distribution to introduce one or more spectral artifacts into the output optical signal that collectively define a unique spectral signature of the photonic device, and
wherein the dispersive region is planar with the input region and the output region.

* * * * *